US010419877B2

(12) United States Patent
Um et al.

(10) Patent No.: US 10,419,877 B2
(45) Date of Patent: Sep. 17, 2019

(54) ELECTRONIC APPARATUS AND IOT DEVICE CONTROLLING METHOD THEREOF

(71) Applicant: Samsung Electronics Co., Ltd., Suwon-si, Gyeonggi-do (KR)

(72) Inventors: Tae-kwang Um, Suwon-si (KR); Jeong-yi Park, Suwon-si (KR); Hyun-cheol Park, Suwon-si (KR); Si-jun Lee, Suwon-si (KR); Soo-in Jang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 323 days.

(21) Appl. No.: 15/280,278

(22) Filed: Sep. 29, 2016

(65) Prior Publication Data

US 2017/0105095 A1  Apr. 13, 2017

(30) Foreign Application Priority Data

Oct. 7, 2015 (KR) .................. 10-2015-0140875
Oct. 30, 2015 (KR) .................. 10-2015-0152244

(51) Int. Cl.
| | | |
|---|---|---|
| G06F 15/16 | (2006.01) | |
| H04W 4/02 | (2018.01) | |
| H04W 4/80 | (2018.01) | |
| H04W 4/04 | (2009.01) | |
| H04W 4/70 | (2018.01) | |
| H04L 12/24 | (2006.01) | |
| H04W 4/08 | (2009.01) | |

(52) U.S. Cl.
CPC ........... *H04W 4/023* (2013.01); *H04W 4/043* (2013.01); *H04W 4/70* (2018.02); *H04W 4/80* (2018.02); *H04L 41/0886* (2013.01); *H04W 4/08* (2013.01)

(58) Field of Classification Search
CPC ........ H04W 4/023; H04W 4/70; H04W 4/043
USPC .................................................. 709/223, 224
See application file for complete search history.

(56) References Cited

U.S. PATENT DOCUMENTS 7,843,323 B2   11/2010   Lim et al.
8,334,771 B2   12/2012   Matsuyama et al.
(Continued)

FOREIGN PATENT DOCUMENTS

EP   2 461 522 A1     6/2012
JP   2012-181105 A    9/2012
(Continued)

OTHER PUBLICATIONS

European Search Report dated Apr. 3, 2019, issued in European Application No. 19162732.2-1218.

*Primary Examiner* — David R Lazaro
*Assistant Examiner* — Mariegeorges A Henry
(74) *Attorney, Agent, or Firm* — Jefferson IP Law, LLP

(57) ABSTRACT

A method of controlling a plurality of devices by an electronic apparatus includes receiving data from a plurality of devices, determining a correlation between at least two devices among the plurality of devices on the basis of the received data, determining a position of a first device on the basis of the correlation, grouping the first device and another device positioned in the vicinity of the first device into one group, and automatically creating group information, and controlling the devices included in the group. The name of the first device may be automatically set using the group information.

20 Claims, 26 Drawing Sheets

(56) References Cited

U.S. PATENT DOCUMENTS

| | | | |
|---|---|---|---|
| 8,620,846 B2 | 12/2013 | Falchuk et al. | |
| 2010/0317392 A1 | 12/2010 | Davis et al. | |
| 2012/0130513 A1 | 5/2012 | Hao et al. | |
| 2013/0006899 A1 | 1/2013 | Cook | |
| 2013/0121296 A1* | 5/2013 | Jung | H04W 72/085 370/329 |
| 2013/0297785 A1* | 11/2013 | Son | H04L 67/22 709/224 |
| 2013/0339441 A1 | 12/2013 | Vasquez et al. | |
| 2014/0218517 A1* | 8/2014 | Kim | H04L 12/2818 348/143 |
| 2014/0241354 A1 | 8/2014 | Shuman et al. | |
| 2014/0266669 A1 | 9/2014 | Fadell et al. | |
| 2015/0052231 A1* | 2/2015 | Sun | H04L 41/0803 709/223 |
| 2015/0358777 A1* | 12/2015 | Gupta | H04L 12/2807 370/254 |
| 2015/0373116 A1* | 12/2015 | Mo | G06F 3/0608 709/219 |
| 2016/0198001 A1 | 7/2016 | Um et al. | |
| 2016/0381543 A1* | 12/2016 | Zhang | H04W 76/14 455/411 |
| 2016/0381726 A1* | 12/2016 | O Donnabhain | H04W 76/023 370/329 |

FOREIGN PATENT DOCUMENTS

| | | |
|---|---|---|
| KR | 10-1204493 B1 | 11/2012 |
| KR | 10-2013-0039625 A | 4/2013 |
| KR | 10-2016-0083760 A | 7/2016 |
| WO | 2015/042370 A1 | 3/2015 |

\* cited by examiner

FIG. 5

| | Door Sensor | Motion Sensor | Door Sensor | Motion Sensor | Context |
|---|---|---|---|---|---|
| 501 | True | True | False | True | Stay In |
| 503 | True | True | False | False | Home Out |
| 505 | True | False | False | True | Home In |
| 507 | True | False | False | False | Stay Out | t1 | t2

ELECTRONIC APPARATUS AND IOT DEVICE CONTROLLING METHOD THEREOF

CROSS-REFERENCE TO RELATED APPLICATIONS

This application claims the benefit under 35 U.S.C. § 119(a) of a Korean patent application filed on Oct. 7, 2015 in the Korean Intellectual Property Office and assigned Serial number 10-2015-0140875, and of a Korean patent application filed on Oct. 30, 2015 in the Korean Intellectual Property Office and assigned Serial number 10-2015-0152244, the entire disclosure of each of which is incorporated herein by reference.

TECHNICAL FIELD

Apparatuses and methods consistent with the present disclosure relate to various electronic devices and an Internet of Things (IoT) device controlling method thereof. More particularly, the present disclosure relates to a method of controlling an IoT device by automatically setting the IoT device installed in a home.

BACKGROUND

Recently, in accordance with the development of semiconductor technologies and wireless communication technologies, a communication function has been included in various things to form a network, such that the things may be conveniently controlled. A technology of allowing the communication function to be included in the things to connect the things to the network is called an Internet of things (IoT), and has been widely used in actual life.

Meanwhile, in order to connect various things (hereinafter, 'things' may be referred to as 'devices') to the network in the IoT environment described above, the respective devices should be able to be identified on the network. To this end, a pairing process of registering the respective devices in a gateway is required. Since the respective devices should be connected to the gateway in the pairing process, a great number of procedures are required in order to pair a plurality of devices with the gateway.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned and/or disadvantages and to provide at least the advantages described below. Accordingly, an aspect of the present disclosure is to provide apparatuses and methods consistent with the present disclosure relate to an electronic apparatus and an Internet of things (IoT) device controlling method thereof.

In order to connect a plurality of devices to a network and identify the plurality of devices connected to the network, setting processes in which a user registers the respective devices in a gateway are required. For example, in order to connect twenty devices to the network, twenty setting processes are required, and thus, many procedures and much time are required. The present disclosure provides a method of automatically setting and controlling a plurality of devices by receiving data from the plurality of devices installed in a home or at a specific place and analyzing the data to determine correlations between the plurality of devices.

In accordance with an aspect of the present disclosure, a device control method of an electronic apparatus is provided. The method includes receiving data from a plurality of devices, determining a correlation between at least two devices on the basis of the received data, determining a position of a first device on the basis of the correlation, grouping the first device and another device positioned in the vicinity of the first device into one group, and automatically creating group information, and controlling the devices included in the group.

In accordance with another aspect of the present disclosure, an electronic apparatus is provided. The electronic apparatus includes a display, an input; a communicator, and at least one processor configured to receive data from a plurality of devices through the communicator, determine a correlation between at least two devices on the basis of the received data, determine a position of a device on the basis of the correlation, group the first device and another device positioned in the vicinity of the first device into one group, and automatically create group information, and controlling the devices included in the group.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or other aspects, features, and advantages of certain embodiments of the present disclosure will be more apparent from the following description taken in conjunction with the accompanying drawings, in which:

FIG. 5 is a view illustrating an example of receiving data output from two devices and determining a context of a user according to an embodiment of the present disclosure;

FIG. 7 is a view illustrating an example in which data are received according to an embodiment of the present disclosure;

FIGS. 9 and 10 are views illustrating correlations between devices according to an embodiment of the present disclosure;

Throughout the drawings, like reference numerals will be understood to refer to like parts, components, and structures.

DETAILED DESCRIPTION

Figure 1:
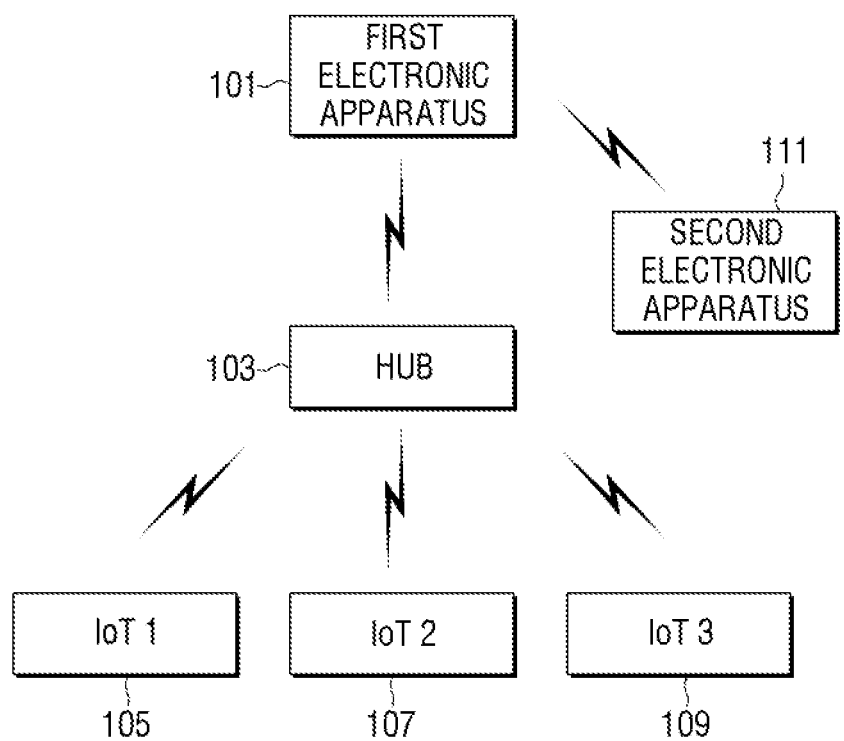
FIG. 1 is a view illustrating a configuration of a system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the present disclosure, an expression "have", "may have", "include", "may include", or the like, indicates existence of a corresponding feature (for example, a numerical value, a function, an operation, a component such as a part, or the like), and does not exclude existence of an additional feature.

In the present disclosure, an expression "A or B", "at least one of A and/or B", "one or more of A and/or B", or the like, may include all possible combinations of items enumerated together. For example, "A or B", "at least one of A and B", or "at least one of A or B" may indicate all of 1) a case in which at least one A is included, 2) a case in which at least one B is included, or 3) a case in which both of at least one A and at least one B are included.

Expressions "first", "second", or the like, used in the present disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, a first component may be named a second component and the second component may also be similarly named the first component, without departing from the scope of the present disclosure.

When it is mentioned that any component (for example, a first component) is (operatively or communicatively} coupled with/to or is connected to another component (for example, a second component), it is to be understood that any component is directly coupled to another component or may be coupled to another component through the other component (for example, a third component). On the other hand, when it is mentioned that any component (for example, a first component) is "directly coupled" or "directly connected" to another component (for example, a second component), it is to be understood that the other component (for example, a third component) is not present between any component and another component.

An expression "configured (or set) to" used in the present disclosure may be replaced by an expression "suitable for", "having the capacity to" "designed to", "adapted to", "made to", or "capable of" depending on a situation. A term "configured (or set) to" may not necessarily mean "specifically designed to" in hardware. Instead, an expression "an apparatus configured to" may mean that the apparatus may "do" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor (AP)) that may perform the corresponding operations by executing one or more software programs stored in a memory apparatus.

Terms used in the present disclosure may be used only in order to describe specific embodiments rather than restricting the scope of other embodiments. Singular forms may include plural forms unless the context clearly indicates otherwise. Terms used in the present specification including technical and scientific terms have the same meanings as those that are generally understood by those skilled in the art to which the present disclosure pertains. Terms defined by a general dictionary among terms used in the present disclosure may be interpreted as means that are the same as or similar to meanings within a context of the related art, and are not interpreted as ideal or excessively formal means unless clearly defined in the present disclosure. In some cases, terms may not be interpreted to exclude embodiments of the present disclosure even though they are defined in the present disclosure.

An electronic apparatus according to various embodiments of the present disclosure may include at least one of, for example, a smartphone, a tablet personal computer (PC), a mobile phone, an image phone, an e-book reader, a desktop PC, a laptop PC, a netbook computer, a workstation, a server, a personal digital assistant (PDA), a portable multimedia player (PMP), a Moving Picture Experts Group (MPEG-1 or MPEG-2) audio layer 3 (MP3) player, a mobile medical device, a camera, and a wearable device. According to various embodiment, the wearable device may include at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), and a living body implantation type wearable device (for example, an implantable circuit).

In some embodiments, an electronic apparatus may be a home appliance. The home appliance may include at least one of, for example, a television (TV), a digital versatile disc (DVD) player, an audio player, a refrigerator, an air conditioner, a cleaner, an oven, a microwave oven, a washing machine, an air cleaner, a set-top box, a home automation control panel, a security control panel, a TV box (for example, HomeSync™ of Samsung Electronics Co., Ltd, Apple TV™ of Apple Inc., or Chromecast™ of Google Inc.), a game console (for example Xbox™, PlayStation™) an electronic dictionary, an electronic key, a camcorder, and a digital photo frame.

In other embodiments, an electronic apparatus may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, an automatic teller's machine of a financial institute, a point of sales (POS) of a shop, and Internet of things (IoT) devices (for example, a light bulb, various sensors, an electric or gas meter, a sprinkler system, a fire alarm, a thermostat, a street light, a toaster, an exercise equipment, a hot water tank, a heater, a boiler, and the like).

According to some embodiments, an electronic apparatus may include at least one of a portion of a furniture or a building/structure, an electronic board, an electronic signature receiving device, a projector, or various meters (for example, water, electricity, gas, electric wave meter, or the like. In various embodiments, an electronic apparatus may be one or a combination of one or more of the various apparatuses described above. An electronic apparatus according to some embodiments may be a flexible electronic apparatus. In addition, an electronic apparatus according to an embodiment of the present disclosure is not limited to the apparatuses described above, but may include new electronic apparatus in accordance with the development of technologies.

Hereinafter, electronic apparatuses according to various embodiments will be described with reference to the accompanying drawings. In the present disclosure, a term "user" may be a person that uses an electronic apparatus or a person that is sensed by a device or may generate an event in the device. The number of users may be plural.

FIG. 1 is a view illustrating a configuration of a system according to an embodiment of the present disclosure.

Referring to FIG. 1, a first electronic apparatus 101, devices 105, 107, and 109, a hub 103, and a second electronic apparatus 111 are illustrated. The devices 105, 107, and 109 include communicators, and may output data through the communicators when events are generated.

The devices 105, 107, and 109 may each include at least one of sensor. For example, the devices 105, 107, and 109 may include at least one of a door sensor, a motion sensor, a temperature sensor, an illuminance sensor, a humidity sensor, a power sensing sensor, a gas sensor, a smoke sensor, and a moisture sensor. These sensors may generate events by sensing an action of a person or generate events by an external environment, and output data. For example, the door sensor may generate an event and output data in the case in which the user opens a door. The motion sensor may generate an event and output data in the case in which it senses a motion of the user. In the case in which the motion sensor is attached to a specific position in a home, the first electronic apparatus 101 may estimate a movement path of the user in the home. In addition, the first electronic apparatus 101 may analyze the data output from the sensor attached to the specific position to estimate a position of a space to which the sensor is attached. The temperature sensor may generate an event and output data in the case in which an external environment approaches a preset temperature. The power sensing sensor may be connected to a power outlet, and may generate an event and output data in the case in which a device connected to the power outlet is powered on.

The devices 105, 107, and 109, illustrated in FIG. 1, may be electronic apparatuses, and may be operated by a user manipulation or be automatically operated in the case in which a given condition is satisfied. Since examples of the electronic apparatuses have been described above, a description therefor will be omitted.

When the events are generated, the devices 105, 107, and 109 may output data to the hub 103. The data may include unique identifications (IDs) of the devices. The unique IDs of the devices may be preset at the time of manufacturing the devices. The devices 105, 107, and 109 may include communicators, and may output the data to the hub 103 through the communicators when the events are generated.

The hub 103 may include a communicator, and may receive the data from a plurality of devices 105, 107, and 109 through the communicator. In the case in which the hub 103 receives the data, the hub 103 may generate time information, add the time information to the received data, and transmit the data to which the time information is added to the first electronic apparatus 101 through the communicator. Alternatively, the hub 103 may transmit the received data to the first electronic apparatus 101 without inserting separate additional data into the received data. The hub 103 may use a first type of communication in the case in which it communicates with the devices 105, 107, and 109, and use a second type of communication in the case in which it communicates with the first electronic apparatus 101. Power consumption of the first type of communication is relatively smaller than that of the second type of communication. For example, the hub 103 may use Zigbee communication in the case in which it communicates with the devices 105, 107, and 109, and use Wi-Fi communication in the case in which it communicates with the first electronic apparatus 101. In the Zigbee communication, communication may be performed at a low power. For example, the hub 103 may collect the data received from the devices 105, 107, and 109 in the home, and transmit the collected data to a server positioned at a long distance or the first electronic apparatus 101 present in the home. The hub 103 may be configured as a separate apparatus or may be embedded in an electronic apparatus such as a television (TV).

The first electronic apparatus 101 may be, for example, a server. The first electronic apparatus 101 may be connected to the second electronic apparatus 111 through a network, and may transmit and receive data to and from the second electronic apparatus 111. The first electronic apparatus 101 may analyze the data received from the hub 103 to determine a correlation between at least two devices 105, 107, and 109. When the data are received, the first electronic apparatus 101 may add time information to the received data and store the data to which the time information is added in a storage or may process the data in real time. Alternatively, in the case in which the data including the time information are received, the first electronic apparatus 101 may store the data in the storage without adding the time information to the data or may process the data in real time. The first electronic apparatus 101 may transmit the data or a result obtained by processing the data to the second electronic apparatus 111.

The second electronic apparatus 111 may be, for example, a TV (or display) or a smartphone, and may receive the data from the first electronic apparatus 101 and display a screen corresponding to the received data on a display. In addition, the second electronic apparatus 111 may receive a command from a user and transmit the received command to the first electronic apparatus 101.

Figure 2:
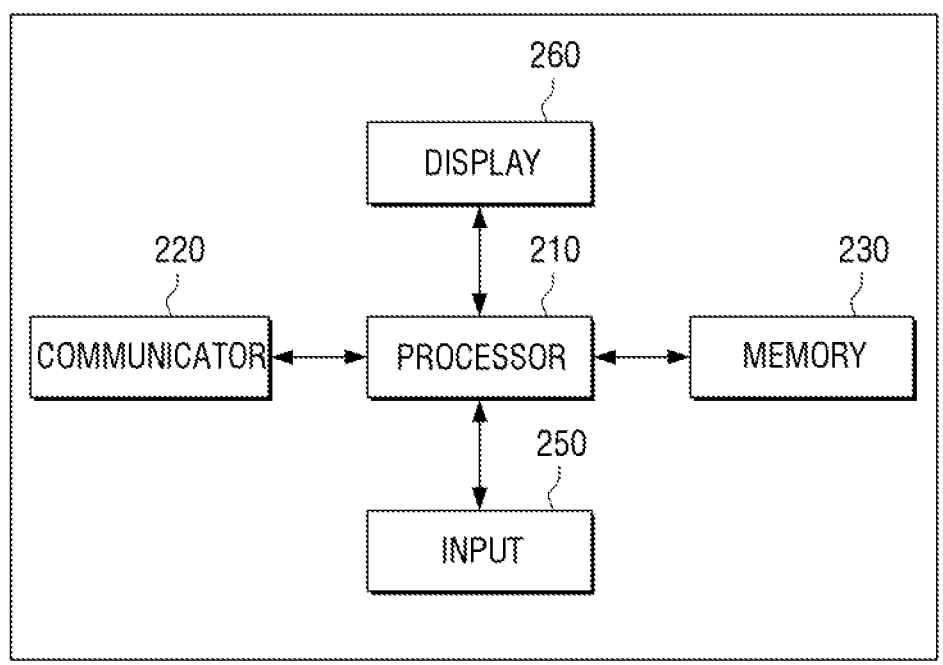
FIG. 2 is a block diagram of an electronic apparatus according to an embodiment of the present disclosure.

FIG. 2 is a block diagram of an electronic apparatus 101 according to an embodiment of the present disclosure.

Referring to FIG. 2, the electronic apparatus 101 may include a communicator 220, a memory 230, an input 250, a display 260, and a processor 210.

The communicator 220 may communicate with another electronic apparatus 111, the hub 103, or the devices 105, 107, and 109. The communicator 220 may be connected to a network through, for example, wireless communication or wired communication to communicate with another electronic apparatus 111 or the hub 103. The wireless communication, which is, for example, a cellular communication protocol, may use at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communications (GSM). In addition, the wireless communication may include, for example, short distance communication. The short distance communication may include at least one of, for example, wireless fidelity (Wi-Fi) direct, Bluetooth, near field communication (NFC), and Zigbee. The wired communication may include at least one of, for example, universal serial bus (USB), high definition multimedia interface (HDMI), recommended standard 232 (RS-232), and plain old telephone service (POTS). The network may include at least one of communication networks such as a computer network (for example, a local area network (LAN) or a wide area network (WAN)), the Internet, and a telephone network.

The communicator 220 may include, for example, a cellular module, a Wi-Fi module, a Bluetooth (BT) module, a GNSS module (for example, a GPS module, a Glonass module, a Beidou module, or a Galileo module), an NFC module, and a radio frequency (RF) module.

The cellular module may provide, for example, a voice call, a video call, a message service, an Internet service, or the like, through a communication network. According to an embodiment, the cellular module may perform discrimination and authentication of an electronic apparatus within the communication network using a subscriber identification module (SIM) (for example, an SIM card). According to an embodiment, the cellular module may perform at least some of functions that may be provided by the processor. According to an embodiment, the cellular module may include a communication processor (CP).

Each of the Wi-Fi module, the BT module, the GNSS module, and the NFC module may include, for example, a processor for processing data transmitted and received through the corresponding module. In some embodiments, at least some (for example, two or more) of the cellular module, the Wi-Fi module, the BT module, the GNSS module, and the NFC module may be included in one integrated chip (IC) or IC package.

The RF module may transmit and receive, for example, a communication signal (for example, an RF signal). The RF module may include, for example, a transceiver, a power amplifier module (PAM), a frequency filter, a low noise amplifier (LNA), an antenna, or the like. According to another embodiment, at least one of the cellular module, the Wi-Fi module, the Bluetooth module, the GNSS module, and the NFC module may transmit and receive an RF signal through a separate RF module.

The subscriber identification module (SIM) may include, for example, a card and/or embedded SIM including a SIM, and may include unique identification (ID) information (for example, an integrated circuit card identifier (ICCID)) or subscriber information (for example, an international mobile subscriber identity (IMSI)).

The memory 230 may include, for example, an internal memory or an external memory. The internal memory may include at least one of, for example, a volatile memory (for example, a dynamic random access memory (DRAM), a static RAM (SRAM), a synchronous dynamic RAM (SDRAM), or the like), a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, or the like), a flash memory (for example, a NAND flash, a NOR flash, or the like), a hard drive, and a solid state drive (SSD)).

The external memory may include a flash drive such as a compact flash (CF), a secure digital (SD), a micro secure digital (Micro-SD), a mini secure digital (Mini-SD), an extreme digital (xD), a multi-media card (MMC), a memory stick, or the like. The external memory may be functionally and/or physically connected to an electronic apparatus through various interfaces.

Referring to FIG. 2, the input 250 may include, for example, a touch panel, a digital stylus or (digital) pen sensor, a key, or an ultrasonic input device. The touch panel may use at least one of, for example, a capacitive scheme, a resistive scheme, an infrared scheme, or an ultrasonic scheme. In addition, the touch panel may further include a control circuit. The touch panel may further include a tactile layer to provide a tactile reaction to a user.

The digital stylus or (digital) pen sensor may be, for example, a portion of the touch panel or may include a separate sheet for recognition. The key may include, for example, a physical button, an optical key, or a keypad. The ultrasonic input device may sense an ultrasonic wave generated from an input tool through a microphone and confirm data corresponding to the sensed ultrasonic wave.

The display 260 may include, for example, a liquid crystal display (LCD), a light emitting diode (LED) display, an organic light-emitting diode (OLED) display, a micro-electromechanical systems (MEMS) display, or an electronic paper display.

The display 260 may display, for example, various contents (for example, a text, an image, a video, an icon, a symbol, or the like) and a user interface (UI) object to a user. The display 260 may include a touch screen, and may receive a touch, gesture, approach, or hovering input using, for example, an electronic pen or a portion of a body of the user.

The processor 210 may drive, for example, an operating system or an application program to control a plurality of hardware or software components connected to the processor and perform various kinds of data processing and calculation. The processor 210 may be implemented by, for example, a system on chip (SoC). According to an embodiment, the processor 210 may further include a graphic processing unit (GPU) and/or an image signal processor. The processor 210 may load and process a command or data received from at least one of other components (for example, a non-volatile memory) in a volatile memory, and store various data in the non-volatile memory.

Figure 3:
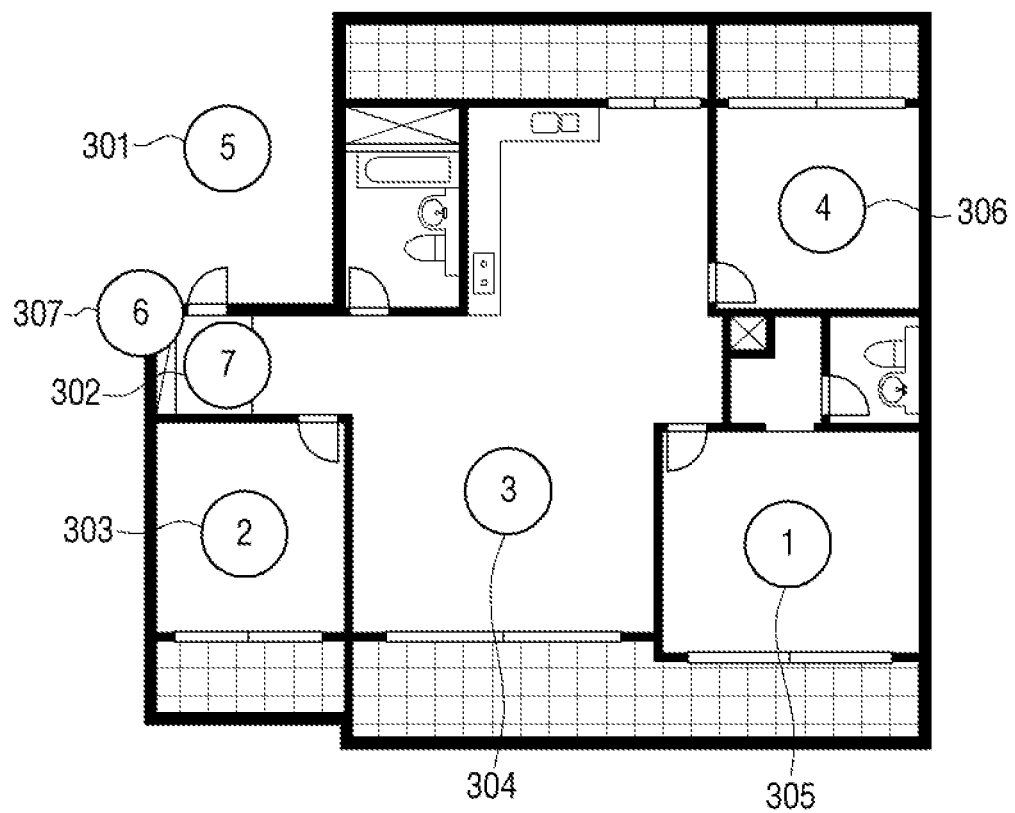
FIG. 3 is a view illustrating a state of devices disposed in a home according to an embodiment of the present disclosure.

FIG. 3 is a view illustrating a state of devices disposed in a home according to an embodiment of the present disclosure.

Referring to FIG. 3, circles 301, 302, 303, 304, 305, 306, and 307 conceptually illustrate actual positions of devices (e.g., devices 105, 107, and 109 shown in FIG. 1) disposed in the home. Although the devices disposed in the home have been described by way of example in an embodiment of the present disclosure, the devices are not limited thereto, but may also be disposed in a building or a specific space. Numerals in the circles may be unique IDs of the devices. The unique IDs of the devices may be given at the time of manufacturing the devices. The devices 301, 302, 303, 304, 305, and 306 may be sensors such as motion sensors sensing motions of persons or things, and may sense generation of events when a motion is sensed. For example, the device 307 is a door sensor, and may sense generation of an event when a door is opened or closed. When the generation of the events is sensed, the devices 301, 302, 303, 304, 305, 306, and 307 may transmit data to the hub 103. The data may include device IDs and device state information. For example, in the case in which the device is the motion sensor, the data may be output when a motion is sensed. In the case in which the device is the door sensor, the data may be output when the door is opened. The electronic apparatus 101 (shown in FIGS. 1 and 2) may receive the data output from a plurality of devices 301, 302, 303, 304, 305, 306, and 307 through the hub 13 (shown in FIG. 1). The electronic apparatus 101 may analyze the data received through the hub 103 to determine a movement path of a user in the home or a context of the user in the home. For example, when the user arrives at a gate, the event may be generated in the device 301. When the user opens a gate door, the event may be generated in the device 307. When the user closes the gate door and enter the home, the events may be generated in the device 307 and the device 302. The electronic apparatus 101 may receive the data output from the devices 301, 307, and 302, and determine that the user enters the home on the basis of a sequence of the received data. In the case in which the user moves to a bedroom through a living room after he/she enters the home, the device 304 and the device 305 may sequentially output the data. The electronic apparatus 101 may receive the data output by the plurality of devices and determine the context of the user on the basis of a sequence of the received data and ID information of the devices.

Figure 4:
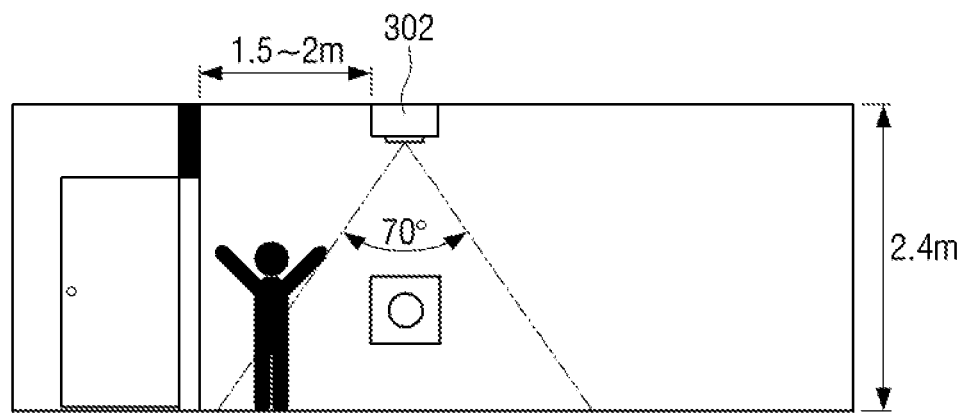
FIG. 4 is a view illustrating an example of a position of a device disposed in a gate according to an embodiment of the present disclosure.

FIG. 4 is a view illustrating an example of a position of a device 302 disposed in a gate according to an embodiment of the present disclosure.

Referring to FIG. 4, when it is assumed that a height from the bottom to the ceiling is 2.4 m, it is preferable that the device 302 is disposed at a position spaced apart from the gate by 1.5 m to 2 m.

FIG. 5 is a view illustrating an example of receiving data output from two devices and determining a context of a user according to an embodiment of the present disclosure. For example, the two devices may be the device 307 including the door sensor and the device 302 including the motion sensor disposed at the gate as illustrated in FIG. 3. The electronic apparatus 101 may determine the context of the user on the basis of signals output from the door sensor and the motion sensor disposed at the gate.

Referring to FIG. 5, the electronic apparatus 101 may basically determine that the context of the user is one of four contexts.

Firstly, in the case in which the user opens the door in the home at a time t1 and closes the door in the home at a time t2, the electronic apparatus 101 may receive the data from the door sensor and the motion sensor at the time t1, and may not receive the data from the door sensor and may receive the data from only the motion sensor at the time t2. In this case, the electronic apparatus 101 may decide that the user stays in the home, and determine that the context of the user is 'Stay In' in operation 501. Here, a time difference between the time t2 and the time t1 may be, for example, 10 seconds.

Secondly, in the case in which the user opens the door in the home and goes to the outside at a time t1 and then closes the door at a time t2, the electronic apparatus 101 may receive the data from the door sensor and the motion sensor at the time t1, and may not receive the data from the door sensor and the motion sensor at the time t2. In this case, the electronic apparatus 101 may decide that the user goes from the inside of the home to the outside of the home, and determine that the context of the user is 'Home Out' in operation 503.

Thirdly, in the case in which the user opens the door outside the home at a time t1 and enters the home at a time t2, the electronic apparatus 101 receives the data from the door sensor and does not receive the data from the motion sensor at the time t1. The electronic apparatus 101 receives the data from the door sensor and receives the data from the motion sensor at the time t2. In this case, the electronic apparatus 101 may decide that the user enters the home from the outside of the home, and determine that the context of the user is 'Home In' in operation 505.

Fourthly, in the case in which the user opens the door at the outside of the home and does not enter the home at a time t1 and closes the door at a time t2, the electronic apparatus 101 receives the data from the door sensor and does not receive the data from the motion sensor at the time t1 and does not receive the data from the door sensor and the motion sensor at the time t2. In this case, the electronic apparatus 101 may decide that the user stays outside the home, and determine that the context of the user is 'Stay Out' in operation 507.

In addition, in the case in which several users are present in the home and someone is sensed at the gate, the electronic apparatus 101 may analyze data received from other sensors present in the home after the context 'Stay In' to determine the context of the user, in order to accurately determine the context of the user. For example, the electronic apparatus 101 may analyze the data received from other sensors after it determines that the context is the 'Stay In' and determine that the context is the 'Home In' when the number of persons in the home is increased. In addition, the electronic apparatus 101 may analyze the data received from other sensors after it determines that the context is the 'Stay In' and determine that the context is the 'Home Out' when the number of persons in the home is decreased.

The electronic apparatus 101 may further subdivide the four contexts to determine the context of the user. The electronic apparatus may determine whether or not the user is present in the home, and separately determine the context in the case in which the user enters the home in the determined state and in the case in which another user enters the home in a state in which the user is present in the home. For example, in the case in which the user first enters the home in a state in which the user is not present in the home, the electronic apparatus may determine that the context is 'First Home in'. In the case in which another user enters the home in a state in which the user is present in the home, the electronic apparatus 101 may determine that the context is 'Home in'. In the case in which the user goes outside of the home, such that the user is not present in the home, the electronic apparatus 101 may determine that the context is 'Last Home out'. In the case in which another user is still present in the home even though the user goes outside of the home, the electronic apparatus 101 may determine that the context is 'Home out'.

Figure 6:
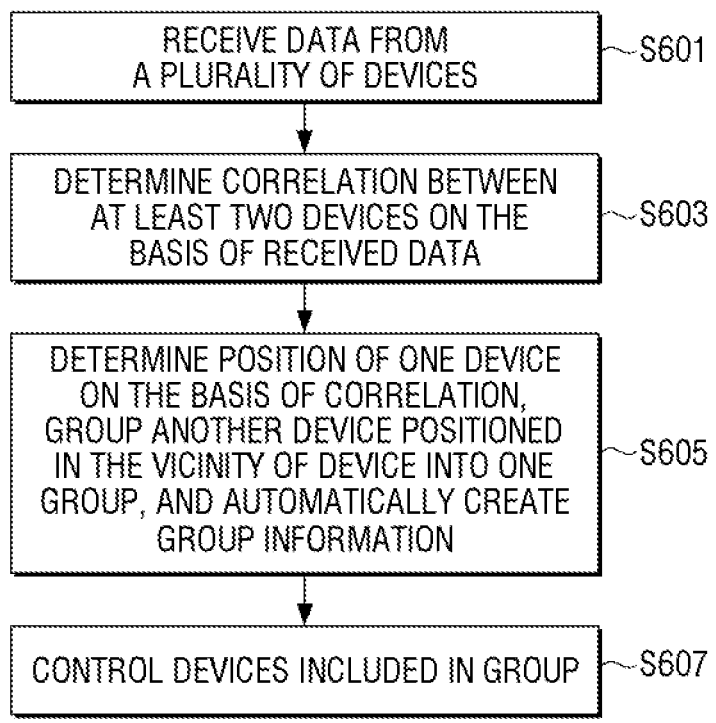
FIG. 6 is a flow chart illustrating processes in which an electronic apparatus receives data from a plurality of devices and processes the received data according to an embodiment of the present disclosure.

FIG. 6 is a flow chart illustrating processes in which an electronic apparatus 101 receives data from a plurality of devices 301 to 307 and processes the received data according to an embodiment of the present disclosure.

Referring to FIGS. 3 and 6, the electronic apparatus 101 (shown in FIGS. 1 and 2) receives the data output from the plurality of devices 301 to 307 in operation S601. In detail, when events are generated, the plurality of devices 301 to 307 may output the data. The data may include identifications (IDs) of the devices. When a person or a thing moves or a specific condition is satisfied, the plurality of devices 301 to 307 may generate the events. The data output from the devices may be transmitted to the hub 103 using low power communication. For example, the devices 301 to 307 may transmit the data to the hub 103 using Zigbee communication at the time of the generation of the events. The hub 103 collects the data output from the devices and may transmit the received/collected data to the electronic apparatus 101. Here, the electronic apparatus 101 may be, for example, a cloud server. The electronic apparatus 101 may receive the data transmitted from the plurality of devices 310 to 307 depending on a sequence of the generated events.

Figure 7:
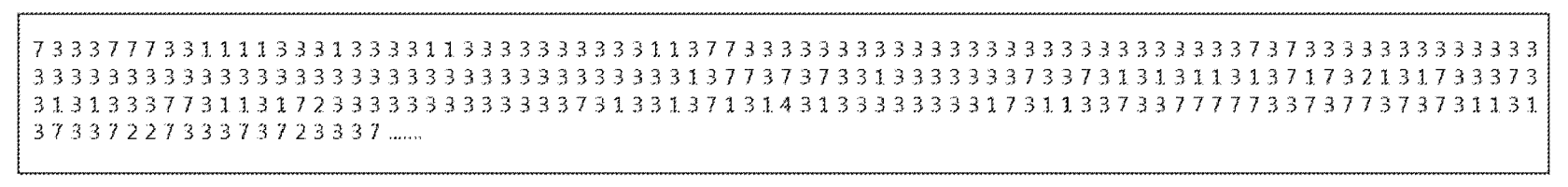

FIG. 7 is a view illustrating an example in which data are received. The electronic apparatus 101 may receive the data depending on a sequence of the generated events according to an embodiment of the present disclosure.

Referring to FIG. 7, the electronic apparatus may receive the data in a sequence of device No. 7→device No. 3→device No. 3→device No. 3→device No. 7→device No. 7.

The electronic apparatus 101 may divide and process the data received from the plurality of devices 301 to 307 through the hub 103 on the basis of ID information of the devices. The electronic apparatus 101 may receive the data from the devices depending on the sequence of the generated events, and may divide the received data when the same device ID is received in order to process the received data. That is, in the case in which the data are continuously received from the device having the same ID, the electronic apparatus 101 may divide and process the received data.

Figure 8:
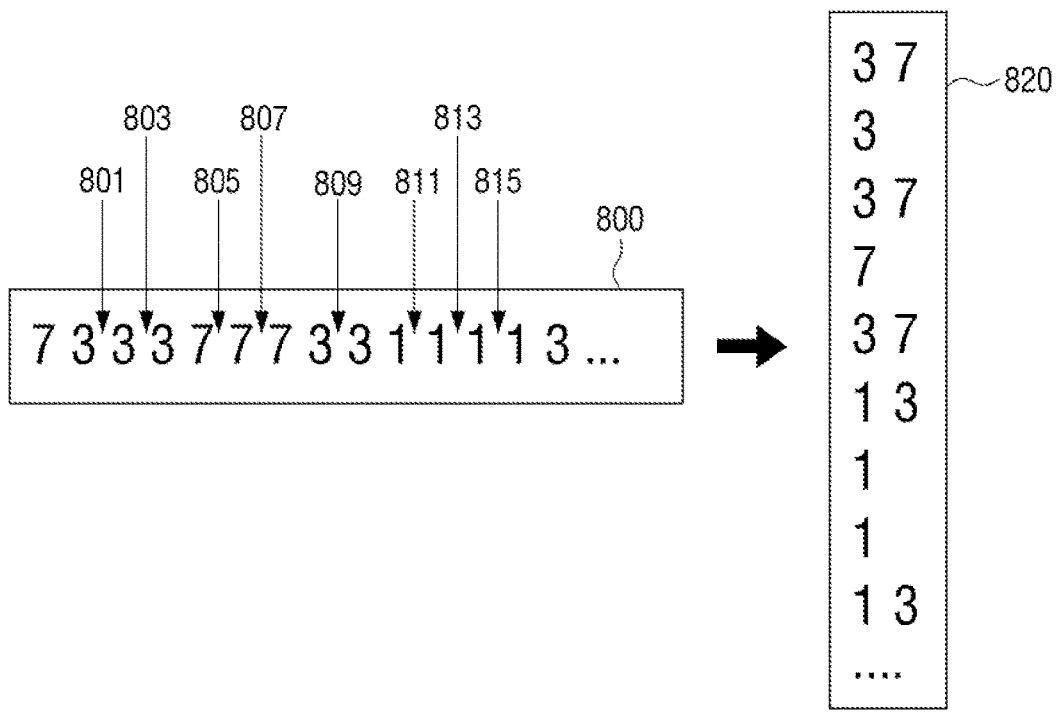
FIG. 8 is a view illustrating a process in which an electronic apparatus processes received data according to an embodiment of the present disclosure.

FIG. 8 is a view illustrating a process in which an electronic apparatus processes received data according to an embodiment of the present disclosure.

Referring to FIG. 8, the electronic apparatus receives the data in a sequence of device No. 7→device No. 3→device No. 3→device No. 3→device No. 7→device No. 7→device No. 7→device No. 3→device No. 3→device No. 1→device No. 1→device No. 1→device No. 3. In the case in which the same device ID is detected in a received data stream 800, the electronic apparatus 101 may divide and process the data stream. For example, since data are received from the same device No. 3 after device No. 3 in the received data stream, the electronic apparatus 101 divides the data at a position 801 and processes the data received from device No. 7 and device No. 3.

Next, since data are also received from the same device No. 3, the electronic apparatus 101 divides the data at a position 803 and processes the data received from device No. 3. Next, since data are received from device No. 7 and are subsequently received from the same device No. 7, the electronic apparatus 101 divides the data at a position 805 and processes the data received from device No. 3 and device No. 7.

Next, since data are received from the same device No. 7, the electronic apparatus 101 divides the data at a position 807 and processes the data received from device No. 7.

Next, since data are received from device No. 3 and are subsequently received from the same device No. 3, the electronic apparatus 101 divides the data at a position 809 and processes the data received from device No. 7 and device No. 3.

Next, since data are received from device No. 1 and are subsequently received from the same device No. 1, the electronic apparatus 101 divides the data at a position 811 and processes the data received from device No. 3 and device No. 1.

Next, since data are received from the same device No. 1, the electronic apparatus 101 divides the data at a position 813 and processes the data received from device No. 1. Next, since data are received from the same device No. 1, the electronic apparatus 101 divides the data at a position 815 and processes the data received from device No. 1. The electronic apparatus 101 may divide the data stream 800 to configure and process a device pair 820.

The electronic apparatus 101 may determine a correlation between at least two devices on the basis of the received data in operation S603. For example, the electronic apparatus may determine a correlation coefficient using an apriori algorithm searching a correlation between the respective data on the basis of a frequency of events generated in the devices. The correlations between the devices may be represented by numerical values.

Figure 10:
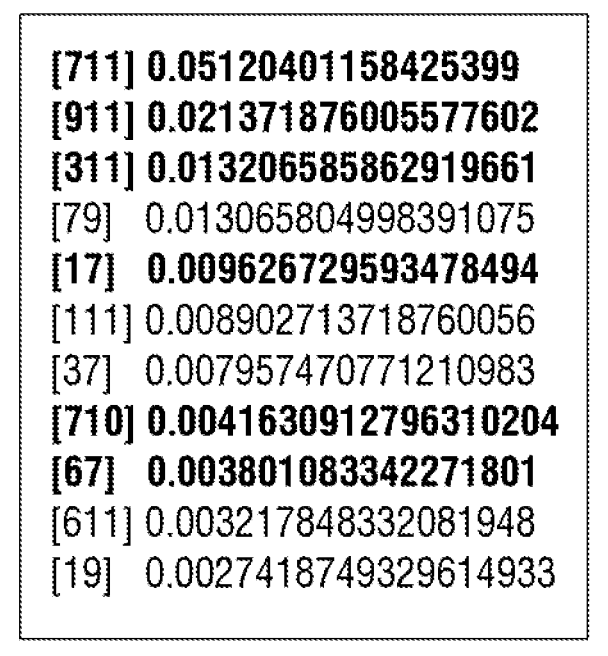

FIGS. 9 and 10 are views illustrating correlations between devices according to an embodiment of the present disclosure.

Referring to FIG. 9, a correlation coefficient between device No. 3 and device No. 7 is 0.175. A correlation coefficient between device No. 1 and device No. 3 is 0.112. A correlation coefficient between device No. 2 and device No. 7 is 0.038. A correlation coefficient between device No. 3 and device No. 4 is 0.024. The electronic apparatus 101 may process the data stream shown in FIG. 8 to calculate the correlation coefficients between the devices illustrated in FIG. 9. The electronic apparatus 101 may analyze the data received from at least two of the plurality of devices 301 to 307 to determine the correlation between the respective devices, determine a position of a device on the basis of the correlation, group another device positioned in the vicinity of the device into one group, and create group information in operation S605.

Referring to FIG. 10, when the correlation coefficient between the two devices is determined, the electronic apparatus 101 (shown in FIGS. 1 and 2) may determine the position of the device on the basis of the correlation coefficient between the two devices. When the position of the device is determined, the electronic apparatus 101 may create a device map on the basis of the determined position of the device. Here, the position of the device may be a logical position indicating a connection relationship between the respective devices rather than a physical position. The electronic apparatus 101 may use space definition data including information on preset spaces in a home in order to convert position information between devices that are logically determined into physical position information. The space definition data may include feature information on a space physically divided in the home. For example, the electronic apparatus 101 may basically assume that a space in the home is divided into a gate, a living room, a kitchen, a bathroom, a bedroom 1, a bedroom 2, and a bedroom 3 and create the device map.

FIGS. 11A, 11B, 11C, and 11D are views illustrating processes in which an electronic apparatus creates a device map on the basis of a correlation coefficient between two devices according to an embodiment of the present disclosure.

Figure 11A:
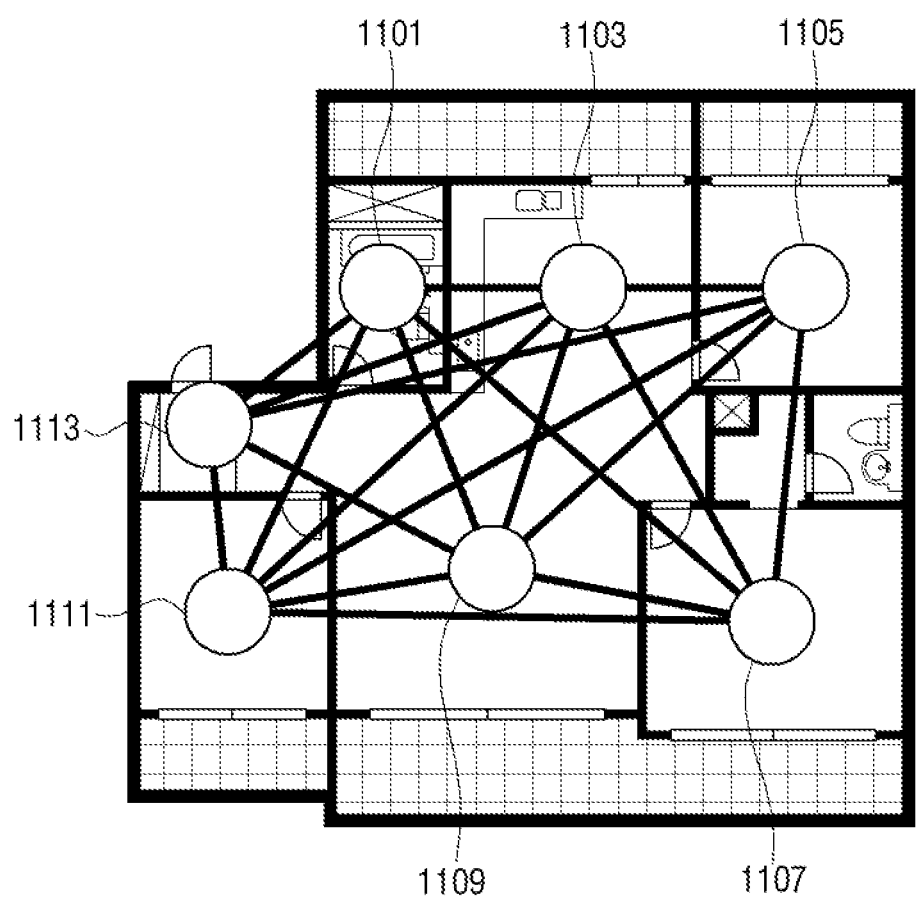
FIGS. 11A, 11B, 11C, and 11D are views illustrating processes in which an electronic apparatus creates a device map on the basis of a correlation coefficient between two devices according to an embodiment of the present disclosure.

Referring to FIGS. 11A to 11D, when the correlation coefficient between the two devices, the electronic apparatus 101 creates the device map on the basis of the correlation coefficient between the two devices. The two devices having the correlation therebetween may be connected to each other by a line. Referring to FIG. 11A, all devices 1101, 1103, 1105, 1107, 1109, 1111, and 1113 are connected to each other by lines (symbolizing connectivity), and it may be estimated that correlations are present between these devices 1101, 1103, 1105, 1107, 1109, 1111, and 1113. The electronic apparatus 101 may connect two devices to each other by a line when a correlation is present between the two devices even though the correlation coefficient is small. Then, the electronic apparatus 101 may determine the correlation between the devices while removing device pairs having small correlation coefficients. The electronic apparatus 101 may create the device map while removing the device pairs that have the small correlation coefficients and may not be combined with each other.

Figure 11B:
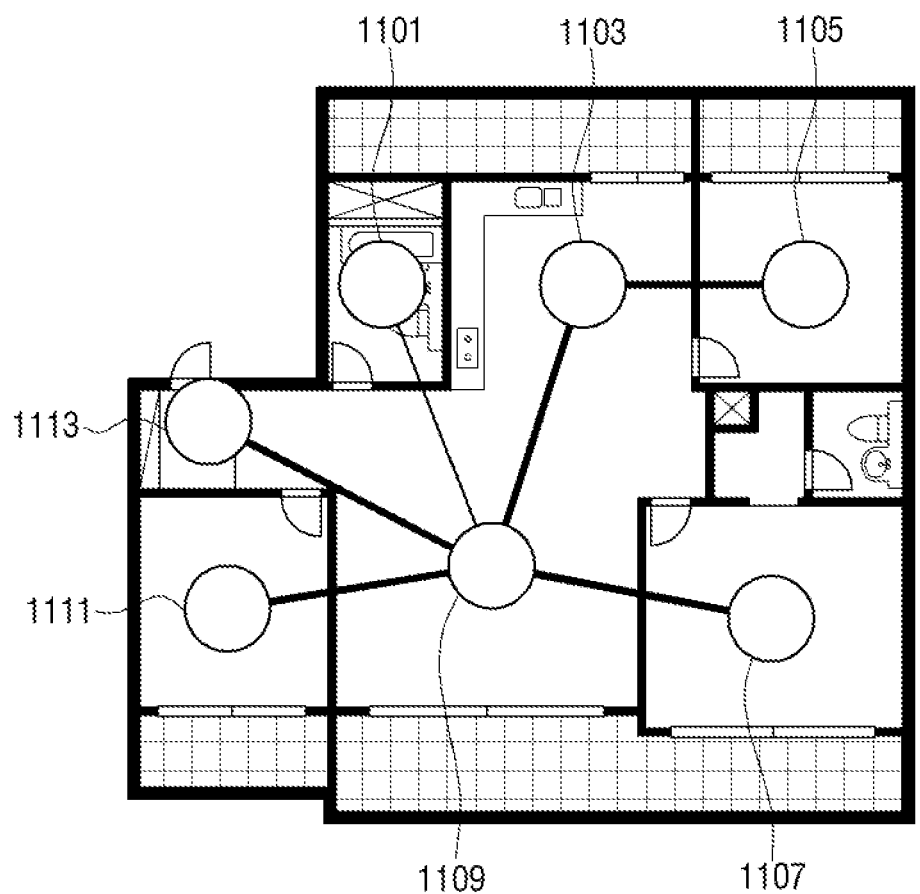

Referring to FIG. 11B, a state in which lines between devices become indistinct or are removed is illustrated. A line between the device 1101 and the device 1113 is removed, and a line between the device 1101 and the device 1109 becomes indistinct. The lines that are removed and become indistinct as described above may mean that a correlation between devices is weak or is not present.

When a position of the device is determined, the electronic apparatus 101 may search for another device positioned in the vicinity of the device 1101, 1103, 1105, 1107, 1109, 1111, or 1113 of which the position is determined. In a process of searching for another device, in the case in which the electronic apparatus receives data from another device within a predetermined time after the electronic apparatus 101 receives data output by the device 1101, 1103, 1105, 1107, 1109, 1111, or 1113 of which the position is determined in the device map, the electronic apparatus 101 may group the device 1101, 1103, 1105, 1107, 1109, 1111, or 1113 of which the position is determined and another device into one group. That is, the electronic apparatus 101 may determine the position of the device on the basis of the correlation, group another device positioned in the vicinity of the device into one group, and create the group information in operation S605 (shown in FIG. 6). For example, in the case in which a TV positioned in the living room is turned on after the device 1109 senses a motion of a user, the electronic apparatus 101 may receive data from the device 1109 and then receive data from the TV. When the electronic apparatus 101 receives data from the TV within a predetermined time after it receives data from the device 1109 of which the position is determined, the electronic apparatus 101 may group the device 1109 and the TV into the same group and create group information. The group information may include a group ID and device IDs configuring the group.

Figure 11C:
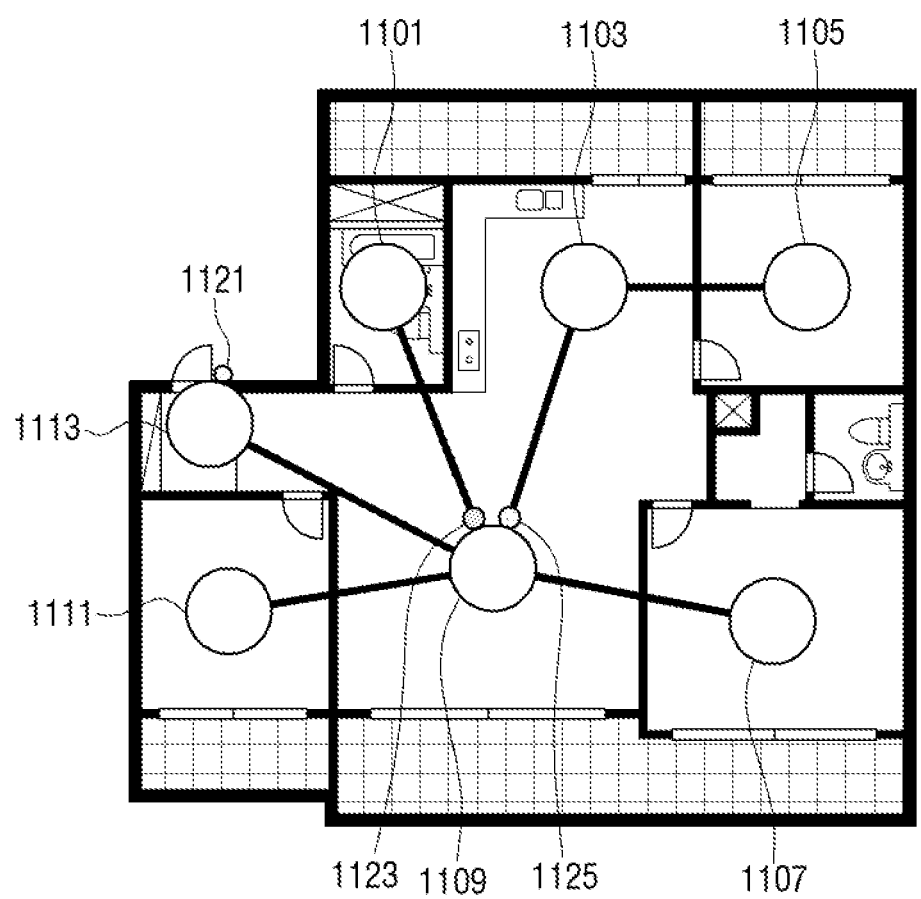

Referring to FIG. 11C, the devices 1101, 1103, 1105, 1107, 1109, 1111, and 1113 of which the positions are determined and the surrounding (or nearby) devices 1121, 1123, and 1125 are illustrated. In the case in which events are generated in the surrounding devices 1121, 1123, and 1125 within a predetermined time after events are generated in the devices 1101, 1103, 1105, 1107, 1109, 1111, and 1113, the electronic apparatus 101 may determine positions of the surrounding devices 1121, 1123, and 1125. For example, when the events are generated in the devices 1123 and 1125 within a predetermined time after the event is generated in the device 1109, the electronic apparatus 101 may group the devices 1109, 1123, and 1125 into the same group. When the event is generated in the device 1121 within a predetermined time after the event is generated in the device 1113, the electronic apparatus 101 may group the devices 1113 and 1121 into the same group.

Figure 11D:
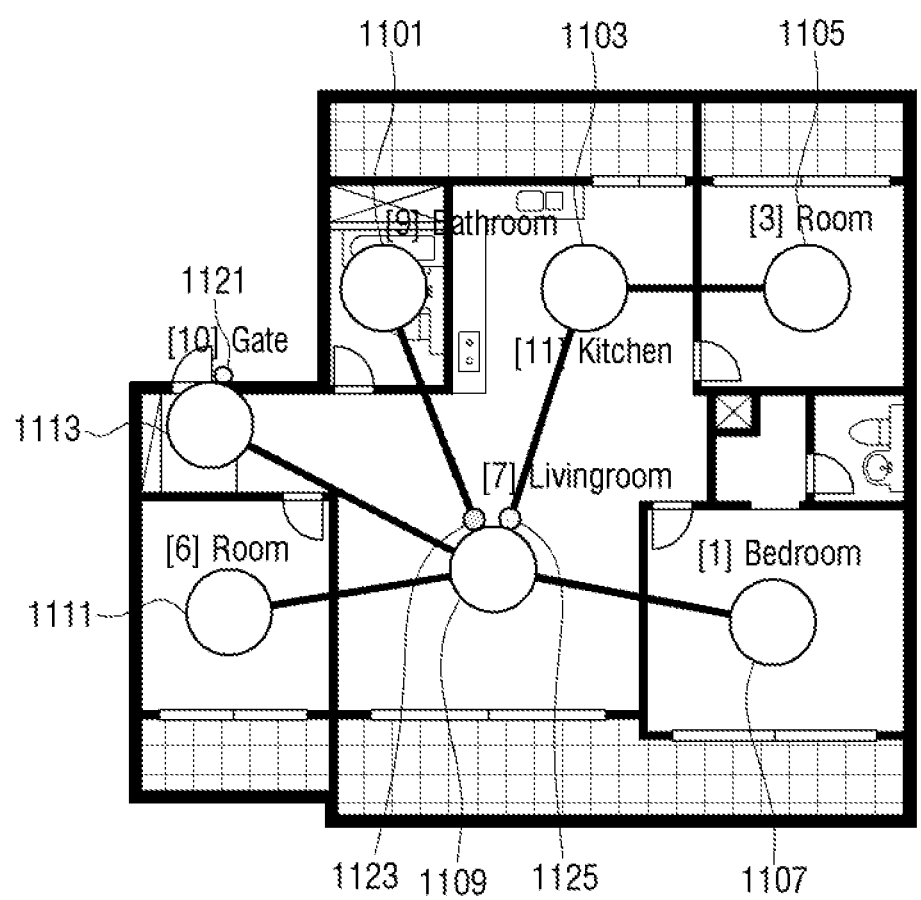

Referring to FIG. 11D, an example of automatically giving a name to the device map is illustrated. When the device map is created, the electronic apparatus 101 may automatically set or create names of the respective devices using characteristics of the devices and preset information in the home. The name of the device may also be a name of a space in which the device is disposed. For example, since any device may be present in only a specific space, the name of the device may be the name of the space in which the device is disposed. Since a door sensor may be attached to the gate (or door), when a signal is received from the door sensor, the electronic apparatus 101 may give a name 'gate' to a space in which the door sensor is disposed or the door sensor. Since a temperature sensor sensing a water temperature of a bath may be attached to the bathroom, when a signal is received from the temperature sensor, the electronic apparatus 101 may give a name 'bathroom' to a space in which the temperature sensor is disposed or the temperature sensor. When a signal is received from a gas sensor, the electronic apparatus 101 may give a name 'kitchen' to a space in which the gas sensor is disposed or the gas sensor.

The electronic apparatus 101 may also utilize motion information of a person in each time zone in order to automatically give names to devices disposed in the home. For example, a frequency in which a device disposed on the bedroom senses a motion of a person during daytimes may be small, but a frequency in which the device disposed on the bedroom senses a motion of the person at night may be relatively large. In this case, the electronic apparatus 101 may determine that a space in which the device is disposed is a 'bedroom' and give a name 'bedroom' to the device. When a device disposed in any space senses motions of several persons and senses that a TV is turned on in the evening, the electronic apparatus 101 may determine that the space is a 'living room' and give a name 'living room' to the device disposed in the space.

The electronic apparatus 101 may refer to basic information on the spaces in the home when it automatically gives names to the devices or the spaces in which the devices are disposed. Here, the basic information may be preset by the electronic apparatus 101, be received from an external server, or be set by a user input.

The electronic apparatus 101 may control devices included in the same group using the device map in operation S607 (as shown in FIG. 6). For example, when a user commands that 'a TV positioned in the living room is powered on' through a voice, the electronic apparatus 101 may determine a position of the living room from the device map and power on the TV.

Figure 12A:
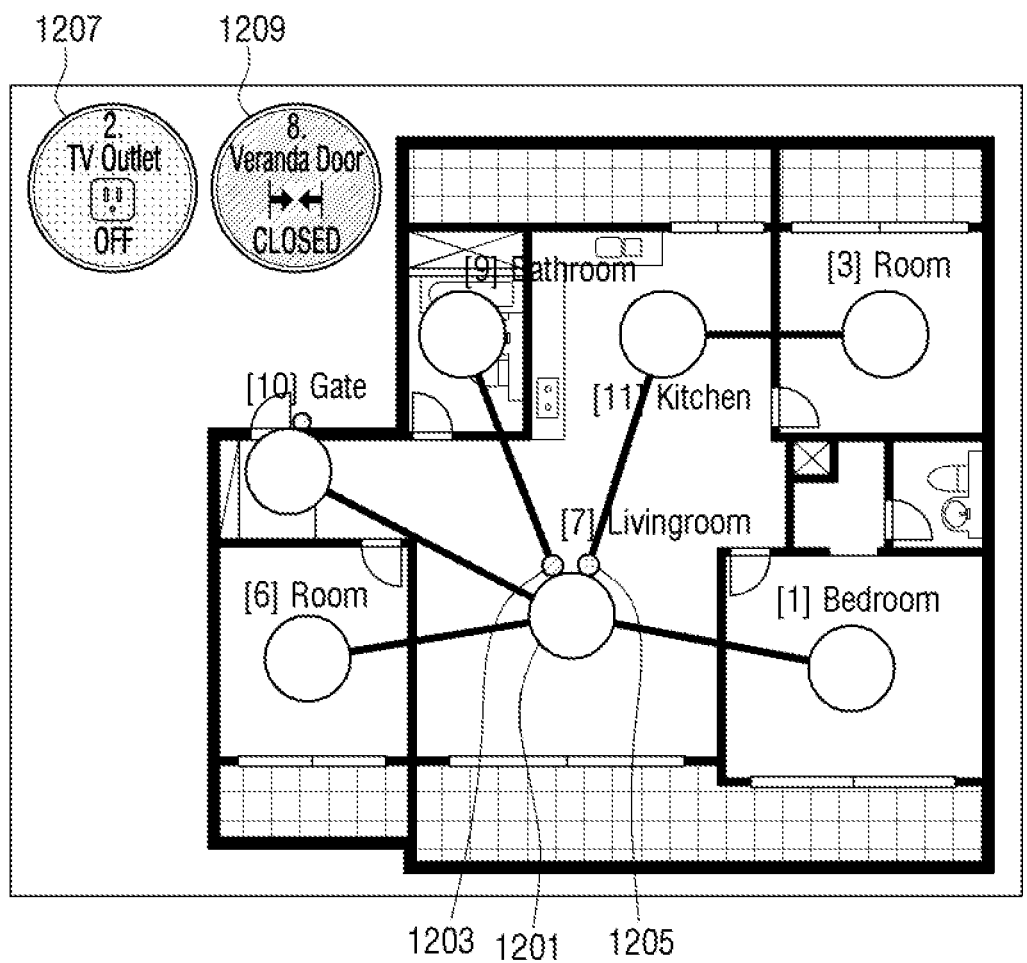
FIGS. 12A and 12B are views illustrating examples of controlling a specific device displayed on a device map according to an embodiment of the present disclosure.
Figure 12B:
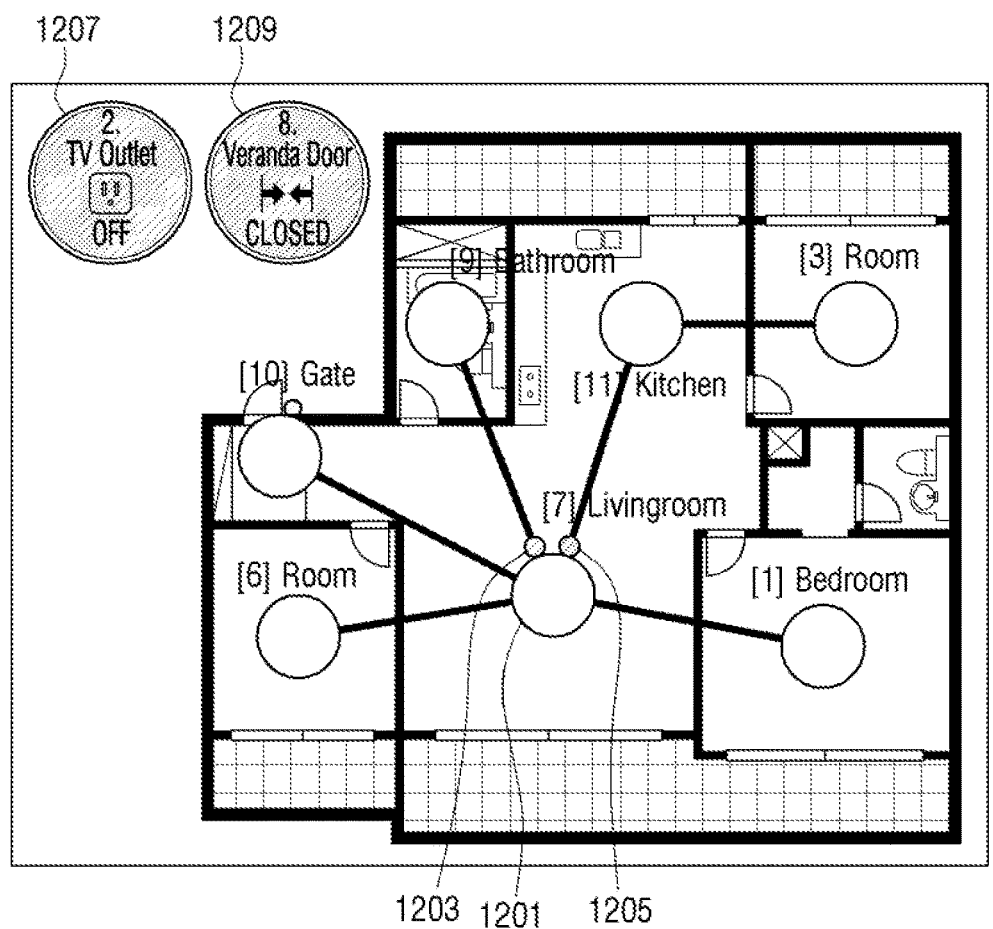

FIGS. 12A and 12B are views illustrating examples of controlling a specific device displayed on a device map according to an embodiment of the present disclosure. The electronic apparatus 101 may display a state of a device on the basis of a color of a graphic object corresponding to the corresponding device. That is, the electronic apparatus 101 may display the state of the device using the color of the graphic object corresponding to the device. For example, the electronic apparatus 101 may display the graphic object by a green color when the device is being operated, and display the graphic object by a yellow color when the device is not operated.

Referring to FIG. 12A, a device map is displayed on a screen of the electronic apparatus 101. In the device map, devices 1201, 1203, and 1205 are grouped into the same group. The device 1203 is being operated and is displayed by a green color, and the device 1205 is not operated and is displayed by a yellow color. The electronic apparatus 101 may receive a user input on the device map displayed on the screen, select a device on the basis of the user input, enlarge and display the selected device, receive a user input in the enlarged and displayed device, and change a state of the device on the basis of the user input. For example, when a user touches graphic objects corresponding to the devices 1203 and 1205 on the device map displayed on the screen of the electronic apparatus, the graphic objects 1207 and 1209 may be enlarged and displayed. When the user touches one graphic object 1207 of the enlarged and displayed graphic objects 1207 and 1209, the electronic apparatus may operate the device 1205 corresponding to the touched graphic object 1207 and change a color of the graphic object 1207 from a yellow color into a green color. Alternatively, the electronic apparatus 101 may flicker the graphic object 1207 or change a size of the graphic object 1207 to display the graphic object 1207 so as to be visually distinguished. Referring to FIG. 12B, the graphic object 1207 may be displayed by the green color.

Figure 13:
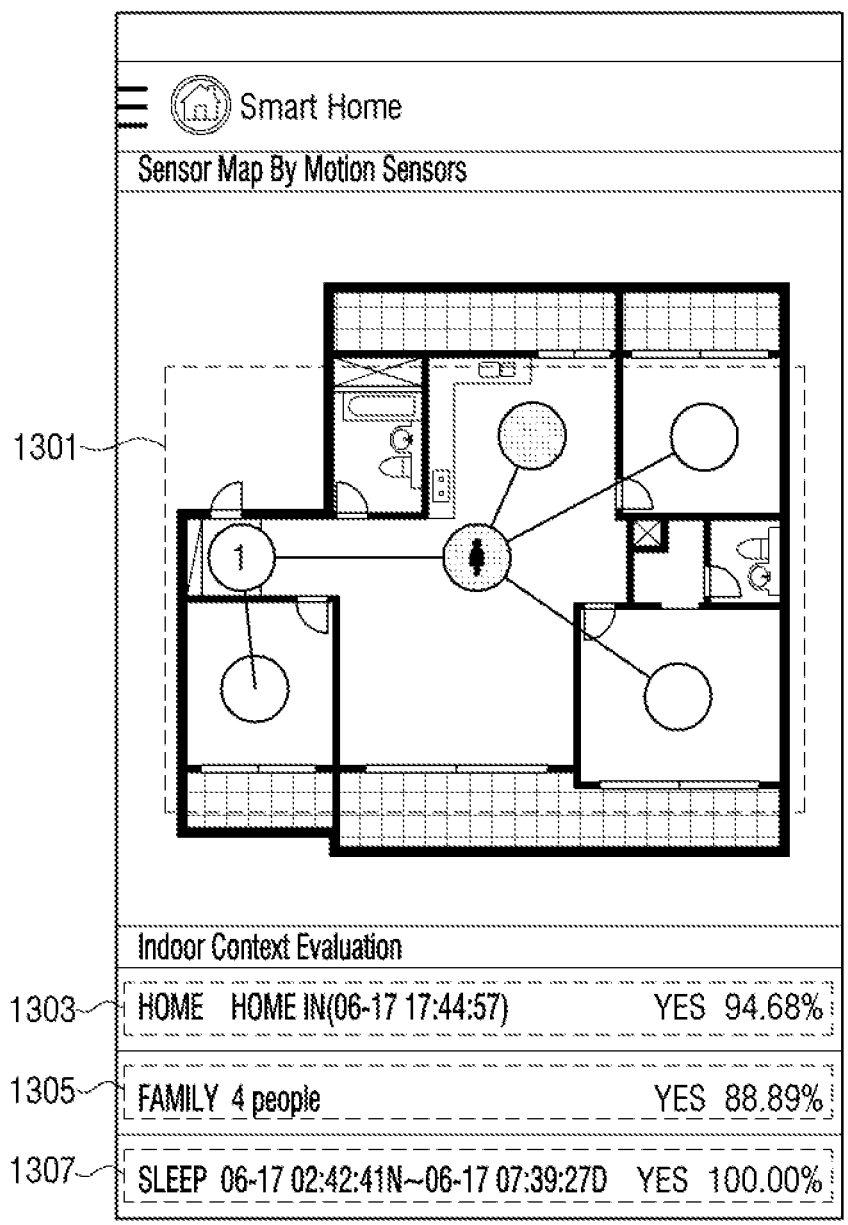
FIG. 13 is a view illustrating an example of a device map displayed on a screen of an electronic apparatus according to an embodiment of the present disclosure.

FIG. 13 is a view illustrating an example of a device map displayed on a screen of an electronic apparatus 101 according to an embodiment of the present disclosure.

Referring to FIG. 13, a device map 1301 is displayed on the screen of the electronic apparatus 101. The device map 1301 may be displayed on a first electronic apparatus (for example, a server) or a second electronic apparatus (for example, a smartphone). The first electronic apparatus 101 may transmit the device map 1301 to the second electronic apparatus 111, and the second electronic apparatus 111 may display the device map 1301 received from the first electronic apparatus 101 on a screen.

In detail, the first electronic apparatus 101 may analyze data received from the devices to configure the device map 130 and create the device map 1301. The first electronic apparatus 101 may automatically set names of devices or names of spaces in which the devices are disposed from pre-stored device information and the basic information on the spaces in the home, and group devices present in the same space into one group.

The first electronic apparatus 101 may transmit the created device map 1301 to the second electronic apparatus.

The second electronic apparatus 111 may display the created device map 1301 on a first region of the screen. A time 1303 in which the user stays in the home, the number 1305 of family members, a sleeping time 1307, and accuracies for the respective items may be displayed by percentages on a second region of the screen.

The time 1303 in which the user stays in the home may be determined by analyzing, for example, data received from the door sensor and a sensor disposed in the gate. The number 1305 of family members may be determined by analyzing data received from the motion sensors disposed in the spaces in the home. For example, in the case in which the motion sensors are disposed in the living room, the bedroom, the kitchen, and the bathroom and data are substantially simultaneously received from the motion sensors disposed in the living room, the bedroom, and the kitchen, the first electronic apparatus 101 may determine that the number 1305 of family members is three. The first electronic apparatus 101 may determine the sleeping time 1307 by analyzing data received from the motion sensor disposed in the bedroom. For example, after a motion is sensed by the motion sensor disposed in the bedroom, in the case in which a motion is not sensed for a predetermined time and a motion is not sensed in the living room or another space, the first electronic apparatus 101 may determine the sleeping time 1307 by analyzing the data received from the motion sensor.

Figure 14:
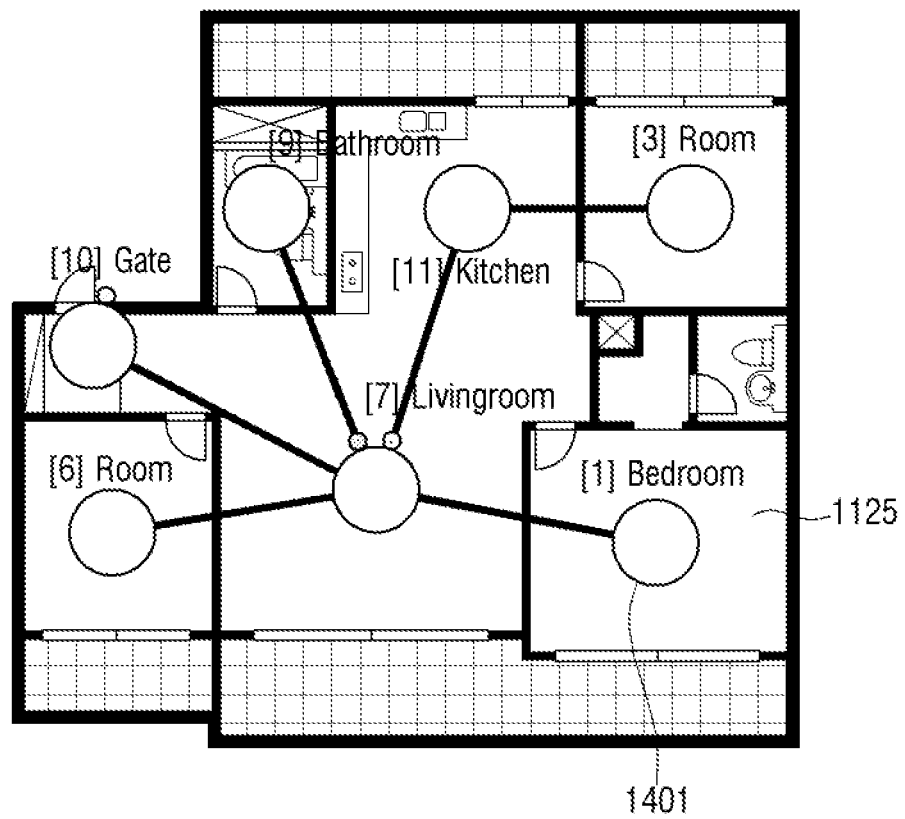
FIG. 14 is a view for describing an example of automatically setting device names using a device map and life log data of a user according to an embodiment of the present disclosure.

FIG. 14 is a view for describing an example of automatically setting device names using a device map and life log data of a user according to an embodiment of the present disclosure. The first electronic apparatus 101 may set names of devices in the device map on the basis of a user input. In addition, the first electronic apparatus 101 may set the names of the devices on the basis of the device map and the life log data.

Referring to FIG. 14, the first electronic apparatus 101 may identify the user using the life log data of the user, and automatically set the names of the devices using the user identification (ID) information.

The life log data may be data indicating a position of a specific user in each time. For example, in the case in which it is decided that the user is not present in the home during daytime of a weekday, moves from the inside of the home to the outside of the home in the morning, and enters the home from the outside of the home at night as an analysis result of the life log data of the used sensed in a device 1401, the first electronic apparatus 101 may determine that the user is a 'father', and automatically set a name of a bedroom 1125 to a 'father's room'. Then, when the user inputs a command 'turn on an electric lamp of the father's room' through a voice, the first electronic apparatus 101 may automatically identify the father's room, and turn on the electric lamp of the father's room.

Hereinafter, an example of controlling an IoT device using context information, which is another embodiment of the present disclosure, will be described with reference to FIGS. 15, 16A, 16B, 17A, 17B, 18A, 18B, and 18C.

Figure 15:
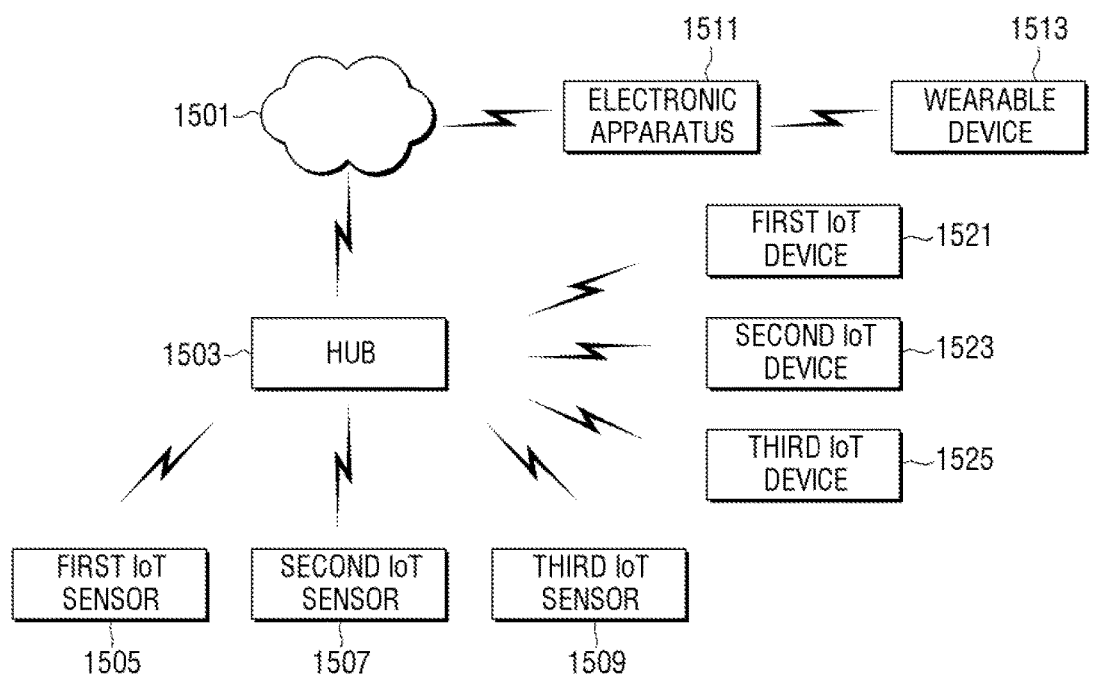
FIG. 15 is a view illustrating a configuration of a system according to an embodiment of the present disclosure.

FIG. 15 is a view illustrating a configuration of a system according to an embodiment of the present disclosure.

Referring to FIG. 15, a cloud server 1501, an electronic apparatus 1511, a plurality of IoT sensors 1505, 1507, and 1509, a plurality of IoT devices 1521, 1523, and 1525, a hub 1503, and a wearable device 1513 are illustrated.

The plurality of IoT sensors 1505, 1507, and 1509 may sense the surrounding environment, and may output data to the hub 1503 when events are generated. Here, the plurality of IoT sensors 1505, 1507, and 1509 may include at least one of a plurality of sensors. For example, each of the plurality of IoT sensors 1505, 1507, and 1509 may include at least one of a door sensor, a motion sensor, a temperature sensor, an illuminance sensor, a humidity sensor, a power sensing sensor, a gas sensor, a smoke sensor, and a moisture sensor. The plurality of sensors may generate events by sensing an action of a person or generate events by an external environment, and output data to the hub 1503. For example, the door sensor may generate an event and output data in the case in which a user opens a door. The motion sensor may generate an event and output data in the case in which it senses a motion of the user. Here, the data may include unique identifications (IDs) of the IoT sensors. The unique IDs of the IoT sensors may be preset at the time of manufacturing the IoT sensors.

The hub 1503 may receive the data from the plurality of IoT sensors 1505, 1507, and 1509. In the case in which the hub 1503 receives the data, the hub 1503 may generate time information, add the time information to the received data, and transmit the data to which the time information is added to the cloud server 1501. Alternatively, the hub 1503 may transmit the received data to the cloud server 1501 without inserting separate additional data into the received data. The hub 1503 may use a first type of communication in the case in which it communicates with the plurality of IoT sensors 1505, 1507, and 1509 or the plurality of IoT devices 1521, 1523, and 1525, and use a second type of communication in the case in which it communicates with the cloud server 1501. Power consumption of the first type of communication is relatively smaller than that of the second type of communication. For example, the hub 1503 may use Zigbee communication as the first type of communication, and use Wi-Fi communication as the second type of communication.

Meanwhile, the hub 1503 may be a separate device. However, it is only an example. That is, the hub 1503 may be embedded in an apparatus such as a TV.

The cloud server 1501 receives the data from the hub 1503, and stores the received data therein. In addition, when a user command for analyzing data (for example, a user command selecting a specific icon, a voice command, or the like) is received from the electronic apparatus 1511, the cloud server 1501 may analyze the received data to create a sensor map and obtain various context information in a home. Since a method in which the cloud server 1501 creates the sensor map using the received data has been described in detail with reference to FIGS. 3 to 10, 11A to 11D, 12A and 12B, 13 and 14, an overlapped description will be omitted. In addition, the cloud server 1501 may analyze the received data to obtain various context information in the home. For example, the cloud server 1501 may analyze information on members in the home, information on the current number of persons in the home, information on a sleeping time, information on main activity places, information on an activity time distribution, and the like, on the basis of the data.

In detail, the cloud server 1501 may analyze data for a preset period (for example, one week or more) to analyze the current number of persons of the members in the home. For example, in the case in which the number of persons periodically and simultaneously sensed in a plurality of spaces in the home for a predetermined time is at most two, the cloud server 1501 may decide that the number of persons of the members in the home is two. In addition, the cloud server 1501 may analyze the data currently received from the plurality of IoT sensors 1505, 1507, and 1509 to analyze information on the current number of persons in the home. For example, in the case in which a motion of one person is sensed through a motion sensor disposed in a kitchen, the cloud server 1501 may decide that the number of persons currently present in the home is one. In addition, the cloud server 1501 may analyze whether or not a person is present in a specific space (for example, a main room, a children's room, or the like) for a preset time to decide a sleeping time. For example, when a motion of a person is sensed again at 6 a.m. in the main room after a motion of the person is sensed at 11:30 p.m. in the main room, the cloud server 1501 may decide that a sleeping time of a user using the main room is a time from 11:30 p.m. to 6 a.m. In addition, the cloud server 1501 may decide information on main activities of members on the basis of data of an IoT sensor disposed in a specific space. For example, when a motion for average two hours per day is sensed in the main home on the basis of data output from an IoT sensor positioned in the main room, the cloud server 1501 may decide that an activity time in the main room is two hours. In addition, when a motion for average four and a half hours per day is sensed on the living room on the basis of data output from an IoT sensor positioned in the living room, the cloud server 1501 may decide that an activity time in the living room is four and a half hours. In addition, the cloud server 1501 may decide an activity time distribution on the basis of data of an IoT sensor disposed in a specific space. That is, the cloud server 1501 may decide an activity time distribution in the main home on the basis of time information of the data output from the IoT sensor positioned in the main room.

Meanwhile, the information on the members in the home, the information on the current number of persons in the home, the information on the sleeping time, the information on the main activity places, the information on the activity time distribution, and the like, have been described as the context information in the home in the embodiment described above. However, it is only an example. That is, various context information may be obtained. For example, the cloud server 1501 may analyze a time in which members are in the kitchen to decide information on a mealtime, and analyze a time in which the members are not in the home to decide information on a leave-time.

In addition, the context information may be created on the basis of data collected for a minimum preset period (for example, three days).

Further, the cloud server 1501 may transmit the obtained sensor map and context information to the external electronic apparatus 1511. In this case, the electronic apparatus 1511 may create a user interface (UI) on the basis of the obtained sensor map and context information, and provide the UI to a user.

Figure 16A:
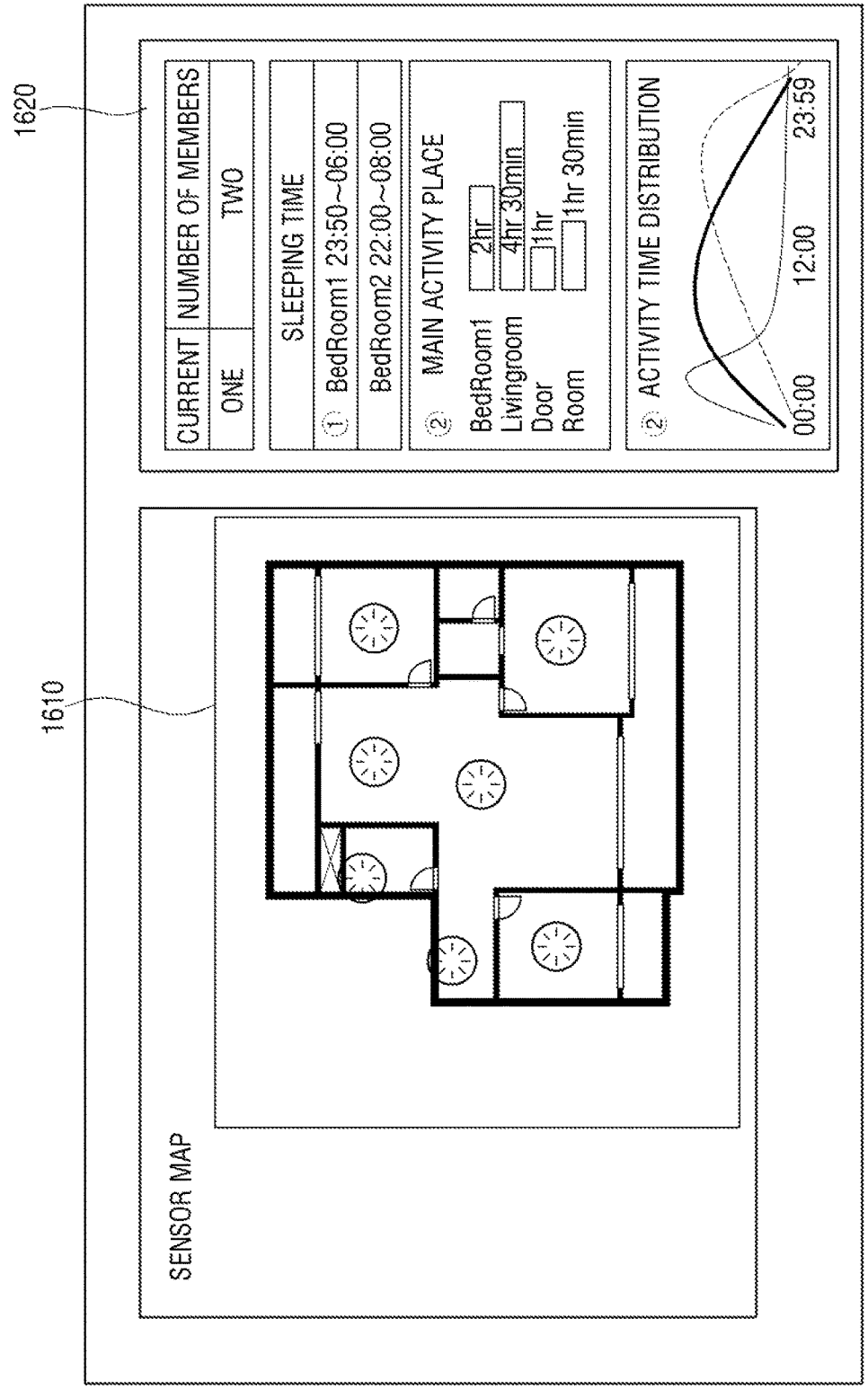
FIGS. 16A and 16B are views illustrating user interfaces (UIs) including a device map and context information according to an embodiment of the present disclosure.
Figure 16B:
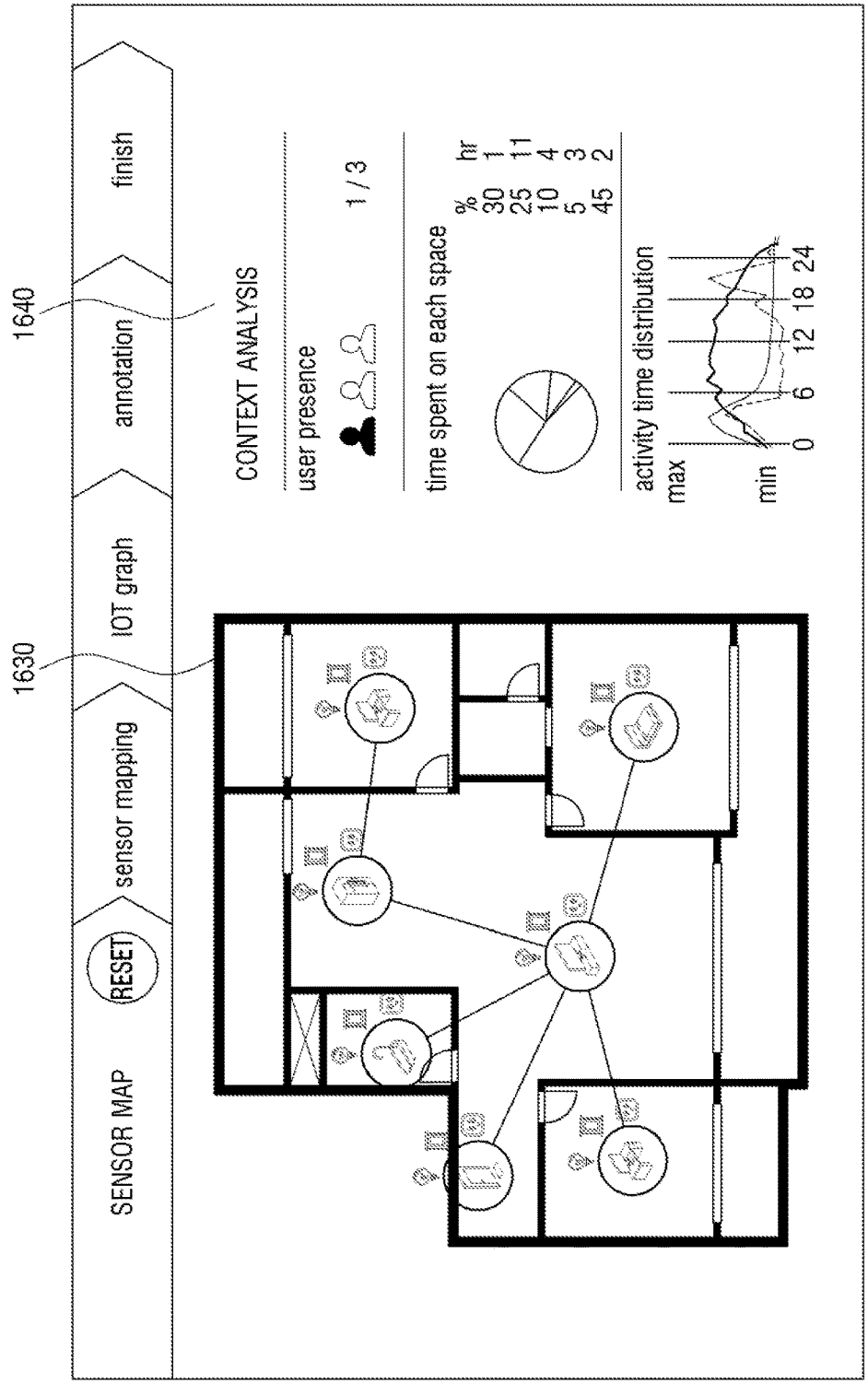

FIGS. 16A and 16B are views illustrating UIs including a device map and context information according to an embodiment of the present disclosure Referring to FIGS. 16A and 16B, the electronic apparatus 1511 (shown in FIG. 15) may provide a UI including a region 1610 showing a sensor map divided into a plurality of regions and a region 1620 showing context information, as illustrated in FIG. 16A. Here, the region 1610 showing the sensor map may be divided into the plurality of regions, and provide information on each region (information on whether or not members are present, and the like). In addition, the region 1620 providing the context information may provide information on members and information on a sleeping time in a text form, provide information on main activity places in a histogram form, and provide information on an activity time distribution in a graph form.

According to another embodiment of the present disclosure, the electronic apparatus 1511 may provide a UI including a region 1630 showing a sensor map divided into a plurality of regions and a region 1640 showing context information, referring to FIG. 16B. Here, the region 1630 showing the sensor map may be divided into a plurality of regions each including icons corresponding thereto, and provide information on IoT devices positioned in the respective regions. Here, the icons corresponding to the IoT devices positioned in the respective regions may represent current states (for example, turn-on/off information, or the like) of the IoT devices, and the IoT devices may be controlled by touching the icons corresponding to the IoT devices. In addition, the region 1640 providing the context information may provide information on members in an image form, provide information on main activity places in a circular graph form, and provide information on an activity time distribution in a linear graph form.

Here, the electronic apparatus 1511 may remotely control the IoT devices through the UI as illustrated in FIG. 16B. For example, when the icon corresponding to the IoT device is selected, the electronic apparatus 1511 may display a menu for controlling the IoT device corresponding to the icon. In addition, when a user command is input through the menu for controlling the IoT device, the electronic apparatus 1511 may transmit a signal corresponding to the user command to the cloud server 1501 or the hub 1503 to control the IoT device.

Meanwhile, the electronic apparatus 1511 according to an embodiment of the present disclosure may be a smartphone. However, it is only an example. That is, the electronic apparatus 1511 may be implemented by another apparatus such as a tablet PC, a laptop PC, or the like.

Figure 17A:
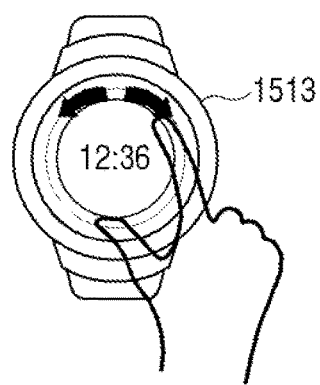
FIGS. 17A, 17B, 18A, 18B, and 18C are views for describing a method of controlling an Internet of things (IoT) device using a wearable device according to an embodiment of the present disclosure.

FIGS. 17A, 17B, 18A, 18B, and 18C are views for describing a method of controlling an IoT device using a wearable device according to an embodiment of the present disclosure Referring to FIGS. 17A, 17B, 18A, 18B, and 18C, a user may confirm states of the IoT devices or control the IoT devices through the wearable device 1513 connected to the electronic apparatus 1511 (shown in FIG. 15). Here, the wearable device 1513 may be a smart watch as illustrated in FIG. 17A. However, it is only an example. That is, the wearable device 1513 may be implemented by another electronic apparatus such as a smart glass, or the like.

First, the wearable device 1513 may change a display screen by touching a bezel in the vicinity of the display screen or change the display screen by performing a drag operation on the display screen, as illustrated in FIG. 17A.

Figure 17B:
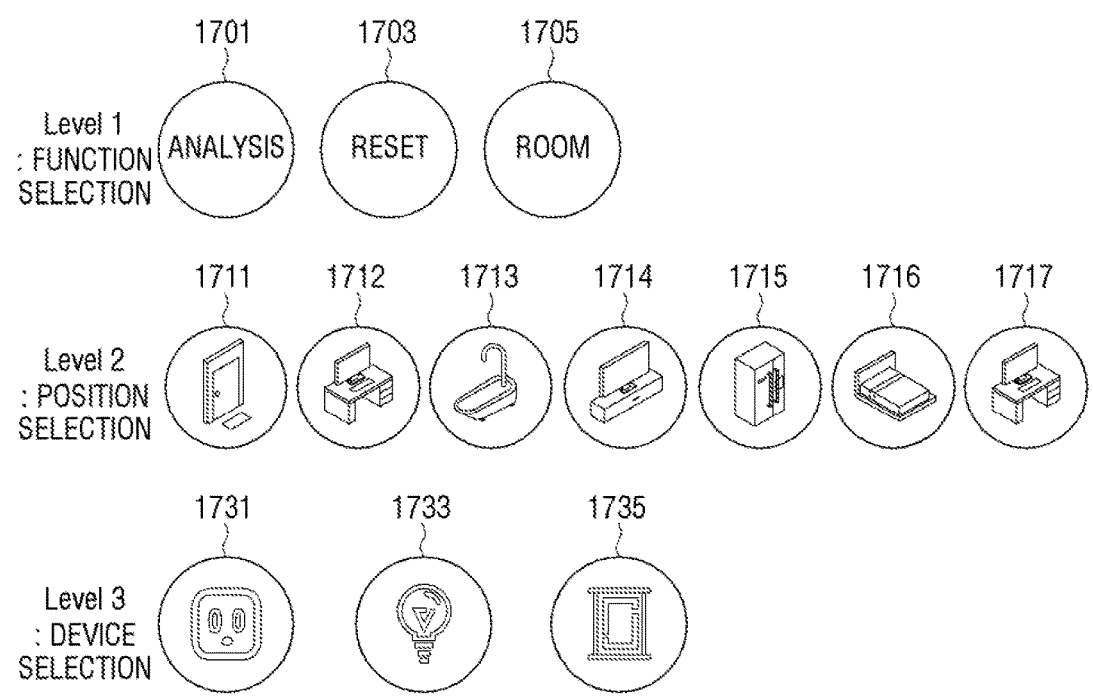
Figure 18A:
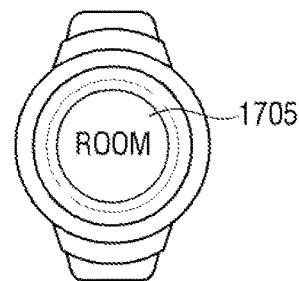
Figure 18B:
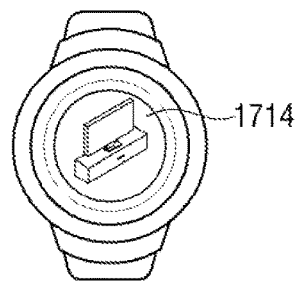
Figure 18C:

An UI provided by the wearable device 1513 may include UI elements divided into a plurality of layers. First, a function selection layer, which is a top layer, may include an analysis screen 1701, a reset screen 1703, and a space selection screen 1705, as illustrated in FIG. 17B. When a user command touching the analysis screen 1701 is input while the analysis screen 1701 is displayed on the wearable device 1513, the wearable device 1513 may transmit a control signal for allowing a sensor map and context information to be analyzed on the basis of existing data to the cloud server 1501 through the electronic apparatus 1511. In addition, when a user command touching the reset screen 1703 is input while the reset screen 1703 is displayed on the wearable device 1513, the wearable device 1513 may transmit a control signal for allowing the existing data to be initialized to the cloud server 1501. In addition, when a user command touching the space selection screen 1705 is input while the space selection screen 1705 is displayed on the wearable device 1513, the wearable device 1513 may display one of a plurality of screens 1711 to 1717 positioned in a space selection layer, which is the next layer. Here, the wearable device 1513 may change the display screen through an operation of touching the bezel as illustrated in FIG. 17A. In addition, when a user command selecting one of the plurality of screens 1711 to 1717 positioned in the space selection layer is input, the wearable device 1513 may display one of a plurality of screens 1731, 1733, and 1735 positioned in an IoT device selection layer included in a selected space. The user may confirm information on the IoT device or control the IoT device through a screen of the IoT device selection layer. For example, in order for the user to control an electric lamp of the living room through the wearable device 1513, the user may input a selection command while a space selection screen 1705 (as illustrated in FIG. 18A) is displayed, input a selection command while a screen 1714 corresponding to the living room (as illustrated in FIG. 18B) is displayed, or input a selection command while a screen 1733 corresponding to the electric lamp (as illustrated in FIG. 18C) is displayed.

That is, the user may control states of the external IoT devices through the wearable device 1513 interworking with the electronic apparatus 1511.

In addition, the UI elements included in the UI provided by the wearable device 1513 may be matched to UI elements included in a UI provided by the electronic apparatus 1511. For example, the UI elements included in the screen provided by the wearable device 1513 as illustrated in FIG. 17B and the UI elements included in the screen provided by the electronic apparatus 1511 as illustrated in FIG. 16B may be matched to each other.

In addition, the cloud server 1501 may provide a service automatically controlling the IoT devices on the basis of data of the IoT sensors and the context information obtained in real time.

As an embodiment of the present disclosure, the cloud server 1501 may provide a temperature managing service in the home on the basis of data measured through a temperature sensor and a humidity sensor provided as the IoT sensors. In detail, the cloud server 1501 may decide temperatures of the respective spaces on the basis of temperature sensors provided in the respective regions. Here, when temperatures of each space are different from each other, the cloud server 1501 may decide that places in which thermal diffusion is made well have been opened, and confirm that places in which thermal diffusion is not made well are in a state in which they are closed. Therefore, the cloud server 1501 may operate a boiler or an air conditioner in each space on the basis of a temperature and an open state of each space. In addition, the cloud server 1501 may automatically provide a temperature managing service on the basis of information on the activity time of the user among the context information. For example, in the case in which the user is not present in the home from 9 a.m. to 6 p.m. on average, the cloud server 1501 may control the boiler or the air conditioner not to be operated or the boiler or the air conditioner to be operated in a power saving mode from 9 a.m. to 6 p.m.

As another embodiment, the cloud server 1501 may provide an illuminance managing service in the home on the basis of data measured through the motion sensor among the IoT sensors. In detail, the cloud server 1501 may control an electric lamp so that lighting becomes bright in only a space in which a motion of the user is sensed at night, and control the electric lamp so that lighting becomes dim or is turned off in a space in which a motion of the user is not sensed.

As still another embodiment, the cloud server 1501 may provide a power managing service in the home on the basis of data measured through the motion sensor among the IoT sensors and the context information. In detail, when it is decided that the home is empty daytimes on the basis of an action pattern of the user among the context information, the cloud server 1501 may turn off the IoT devices in the home or control power management.

Meanwhile, a case in which the temperature managing service, the illuminance managing service, and the power managing service are provided on the basis of the data of the IoT sensors and the context information has been described in the embodiment described above. However, this is only an example. That is, various services may be provided on the basis of the data of the IoT sensors and the context information. For example, various services such as a humidity managing service, a crime preventing service, an automatic washing service, and the like, may be provided.

In addition, the cloud server 1501 may provide various services as well as a service controlling the IoT devices on the basis of data of the IoT sensors and the context information. For example, the cloud server 1501 may provide an advertisement providing service on the basis of the context information. For example, in the case in which it is decided that the user is present in a specific place (for example, the kitchen) in a specific time zone (for example, at night), the cloud server 1501 may provide an advertisement (for example, a midnight meal advertisement) through an IoT device (for example, a refrigerator) disposed in the specific place or the electronic apparatus 1511.

In addition, the cloud server 1501 may decide a variation situation of the plurality of IoT sensors on the basis of data received from the plurality of IoT sensors. In detail, the cloud server 1501 may compare a pre-stored IoT sensor list and unique ID information of the IoT sensors received from the plurality of IoT sensors with each other to decide whether or not IoT sensors are added, changed, and deleted. In addition, in the case in which the IoT sensors are added, changed, and deleted, the cloud server 1501 may transmit a notifying message for the addition, the change, and the deletion of the IoT sensors to the electronic apparatus 1511.

In addition, the cloud server 1501 may decide the number of events of the IoT sensors (for example, the motion sensors), and decide a total number of events. In addition, in the case in which the number of events is less than a preset first value (for example, 10), the cloud server 1501 may maintain an existing sensor map, and notify the user that the existing sensor map is maintained. In the case in which the number of events is the first value or more and is less than a preset second value (for example, the number of sensors is 10), the cloud server 1501 may end an analysis.

In addition, the cloud server 1501 may obtain the sensor map, and analyze and update the sensor map on the basis of data of a current time from a final analysis date. Particularly, in the case in which an analysis data is yesterday, the cloud server 1501 may compare the sensor map with an existing sensor map to represent added, deleted, and changed sensors in the sensor map and update the sensor map and the analysis date. However, in the case in which the analysis data is not yesterday, the cloud server 1501 may compare the updated sensor map and the existing sensor map with each other to create a temporary sensor map. In addition, the cloud server 1501 may further collect data for one day or more to update the sensor map and the analysis date.

In addition, the cloud server 1501 may decide the number of persons of members in the home through various IoT sensors. In detail, in the case in which it is decided that a person enters the home (Stay in) through the IoT sensor, the cloud server 1501 may analyze whether the number of persons is increased or decreased after two minutes. That is, the cloud server 1501 may decide a motion frequency at an interval of two minutes to decide whether users currently present in the home are increased.

According to the various embodiments as described above, a more convenient and intuitive service may be provided to the user on the basis of the data obtained through the IoT sensors and the context data.

Although the present disclosure has been described with reference to the embodiments and the accompanying drawings, the present disclosure is not limited to the above-mentioned embodiments, but may be variously modified and changed from the above description by those skilled in the art to which the present disclosure pertains. Operations according to the embodiment of the present disclosure may be implemented by a single processor. In this case, program commands for performing operations implemented by various computers may be recorded in a computer-readable medium. The computer-readable recording medium may include program commands, data files, data structures, or the like, alone or a combination thereof. The program commands may be specially designed and constituted for the present disclosure or be known to those skilled in the art. Examples of the computer-readable recording medium may include a magnetic medium such as a hard disk, a floppy disk, or a magnetic tape; an optical medium such as a compact disk read only memory (CD-ROM) or a digital versatile disk (DVD); a magneto-optical medium such as a floptical disk; and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler. In the case in which all or some of the base stations or the relays described in the present disclosure are implemented by computer programs, a computer-readable recording medium in which the computer programs are stored are included in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a plurality of devices by an electronic apparatus, the method comprising:
  receiving data from a plurality of devices;
  determining a correlation among the plurality of devices based on a frequency with which data is received from other devices within a predetermined time after the data is received from one of the plurality of devices;
  determining a logical position of a first device indicating a connection relationship between other devices among the plurality of devices based on the determined correlation;
  grouping the first device and a second device among the plurality of devices logically positioned in the vicinity of the first device into one group;

automatically creating group information; and
controlling the devices included in the group.

2. The method of claim 1, wherein, in the determining of the correlation, the correlation is determined on the basis of a sequence of the received data and identification (ID) information of the plurality of devices.

3. The method of claim 1, wherein, in the determining of the logical position of the first device on the basis of the correlation, the grouping of the first device and the second device positioned in the vicinity of the first device into one group, and the automatically creating of the group information, the first device and the second device disposed in the vicinity of the first device are grouped on the basis of the received data.

4. The method of claim 3, wherein, in the determining of the logical position of the device on the basis of the correlation, the grouping of the first device and the second device positioned in the vicinity of the first device into one group, and the automatically creating of the group information, the first device and the second device are grouped into one group when data are received from the second device within a predetermined time after data output from the first device is received.

5. The method of claim 1, further comprising automatically creating a name of the first device on the basis of the received data and the group information.

6. The method of claim 5, further comprising:
displaying the automatically created name of the first device on a display, and
receiving a user input to set a name of the first device.

7. The method of claim 1, further comprising identifying a user on the basis of the received data, the group information, and information on a time and a date in which the data are received.

8. The method of claim 7, further comprising automatically setting a name of the first device using information on the identified user.

9. The method of claim 1, further comprising dividing and processing the data received from the plurality of devices on the basis of ID information of the plurality of devices.

10. The method of claim 9, further comprising dividing and processing continuously received data when the data are continuously received from one device among the plurality of devices.

11. An electronic apparatus comprising:
a display;
an input device;
a communicator; and
at least one processor configured to:
receive data from a plurality of devices through the communicator,
determine a correlation among the plurality of devices based on a frequency with which data is received from other devices within a predetermined time after the data is received from one of the plurality of devices,
determine a logical position of a first device indicating a connection relationship between other devices among the plurality of devices based on the determined correlation,
group the first device and a second device among the plurality of devices logically positioned in the vicinity of the first device into one group,
automatically create group information, and
control the devices included in the group.

12. The electronic apparatus as claimed in claim 11, wherein the at least one processor is further configured to determine the correlation on the basis of a sequence of the received data and identification (ID) information of the devices.

13. The electronic apparatus as claimed in claim 11, wherein the at least one processor is further configured to group the first device and the second device disposed in the vicinity of the first device on the basis of the received data.

14. The electronic apparatus as claimed in claim 13, wherein the at least one processor is further configured to group the first device and the second device into one group when data are received from the second device within a predetermined time after data output from the first devices is received.

15. The electronic apparatus as claimed in claim 11, wherein the at least one processor is further configured to automatically create a name of the first device on the basis of the received data and the group information.

16. The electronic apparatus as claimed in claim 15, wherein the at least one processor is further configured to:
control the display to display the automatically created name of the first device on the display, and
receive a user input through the input device to set a name of the first device.

17. The electronic apparatus as claimed in claim 11, wherein the at least one processor is further configured to identify a user on the basis of the received data, the group information, and information on a time and a date in which the data are received.

18. The electronic apparatus as claimed in claim 17, wherein the at least one processor is further configured to automatically set a name of the first device using information on the identified user.

19. The electronic apparatus as claimed in claim 11, wherein the at least one processor is further configured to divide and process the data received from the plurality of devices on the basis of identification (ID) information of the devices.

20. The electronic apparatus as claimed in claim 19, wherein the at least one processor is further configured to divide and process continuously received data when the data are continuously received from one of the plurality of devices.

* * * * *